US010733986B2

(12) United States Patent
Hayakawa

(10) Patent No.: US 10,733,986 B2
(45) Date of Patent: Aug. 4, 2020

(54) APPARATUS, METHOD FOR VOICE RECOGNITION, AND NON-TRANSITORY COMPUTER-READABLE STORAGE MEDIUM

(71) Applicant: FUJITSU LIMITED, Kawasaki-shi, Kanagawa (JP)

(72) Inventor: Shoji Hayakawa, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 15/466,995

(22) Filed: Mar. 23, 2017

(65) Prior Publication Data

US 2017/0294188 A1 Oct. 12, 2017

(30) Foreign Application Priority Data

Apr. 12, 2016 (JP) .................................. 2016-079481

(51) Int. Cl.
*G10L 15/22* (2006.01)
*G10L 15/01* (2013.01)
(Continued)

(52) U.S. Cl.
CPC .............. *G10L 15/22* (2013.01); *G10L 15/01* (2013.01); *G10L 15/02* (2013.01); *G10L 15/187* (2013.01);
(Continued)

(58) Field of Classification Search
CPC ............... G10L 15/02; G10L 2015/025; G10L 2015/088; G10L 15/22; G10L 25/87;
(Continued)

(56) References Cited

U.S. PATENT DOCUMENTS

2006/0009980 A1* 1/2006 Burke .................... G10L 15/30
704/270
2007/0276691 A1* 11/2007 Grant ................... G06Q 10/087
705/26.1
(Continued)

FOREIGN PATENT DOCUMENTS

JP 62-173498 7/1987
JP 11-175087 A 7/1999
(Continued)

OTHER PUBLICATIONS

Japanese Office Action dated Nov. 12, 2019 for corresponding Japanese Application No. 2016-079481 with English Translation, 11 pages.
(Continued)

*Primary Examiner* — Angela A Armstrong
(74) *Attorney, Agent, or Firm* — Fujitsu Patent Center

(57) ABSTRACT

An apparatus for voice recognition transforms voice information into a phoneme sequence expressed by characters of individual phonemes corresponding to feature parameters of the voice information, determines, based on a first likelihood and a second likelihood, whether or not collation succeeds, executes a matching operation that includes associating, based on a collation result, individual phonemes of the phoneme sequence of the voice information at a time of a failure of collation and individual phonemes of a phoneme sequence of previous voice information with each other, and executes a determination operation that includes determining, based on a result of the association, whether or not the phoneme sequence of the voice information is based on repetitive vocalization.

19 Claims, 20 Drawing Sheets

(51) Int. Cl.
  *G10L 15/30* (2013.01)
  *G10L 15/02* (2006.01)
  *G10L 15/187* (2013.01)
  *G10L 15/12* (2006.01)

(52) U.S. Cl.
  CPC .............. *G10L 15/30* (2013.01); *G10L 15/12* (2013.01); *G10L 2015/025* (2013.01); *G10L 2015/223* (2013.01); *G10L 2015/228* (2013.01)

(58) Field of Classification Search
  CPC ....... G10L 15/01; G10L 15/12; G10L 15/187; G10L 2015/223; G10L 15/30; G10L 2015/228
  See application file for complete search history.

(56) References Cited

U.S. PATENT DOCUMENTS

2011/0184737 A1* 7/2011 Nakano ................... G10L 15/12
                                                    704/254
2012/0101821 A1   4/2012 Tsuda
2012/0215528 A1*  8/2012 Nagatomo ............. G10L 15/30
                                                    704/211
2017/0229120 A1*  8/2017 Engelhardt ............. G10L 15/19

FOREIGN PATENT DOCUMENTS

JP    2002-006883      1/2002
JP    2012-093422 A    5/2012

OTHER PUBLICATIONS

Watanabe, Takao, et al., "Unknown Utterance Rejection Using Likelihood Normalization Based on Syllable Recognition", The Transactions of the Institute of Electronics, Information and Communication Engineers, vol. J75-D-II, No. 12, pp. 2002-2009, Dec. 25, 1992, see JPOA filed herewith.

* cited by examiner

FIG. 2

| REPLACEMENT RULE | PHONEME GROUP | REPRESENTATIVE PHONEME |
|---|---|---|
| 1 | "s", "z" | "s" |
| 2 | "t", "d" | "t" |
| 3 | "sh", "ch", "j" | "sh" |
| 4 | "h", "f", "b" | "h" |
| 5 | "k", "g" | "k" |

| ENVIRONMENTAL INFORMATION | GUIDANCE CONTENT | PRIORITY ORDER |
|---|---|---|
| AIR CONDITIONER IS IN "ON" STATE | "TURN OFF AIR CONDITIONER AND VOCALIZE AGAIN" | 3 |
| TRAVEL AT SPEED OF 80 km / h OR MORE | "REDUCE SPEED OR MAKE STOP, AND VOCALIZE" | 4 |
| WINDOW IS OPEN | "SHUT WINDOW AND VOCALIZE" | 2 |
| SNR IS LESS THAN THRESHOLD VALUE | "VOCALIZE LITTLE LOUDER" | 1 |

APPARATUS, METHOD FOR VOICE RECOGNITION, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-079481, filed on Apr. 12, 2016, the entire contents of which are incorporated herein by reference.

FIELD

The embodiments discussed herein are related to an apparatus, method for voice recognition, and a non-transitory computer-readable storage medium.

BACKGROUND

In order to enhance the convenience of a user who is driving, there is developed a voice interface capable of operating an in-vehicle device such as a car navigation system by using voices. In a case of using, for example, the voice interface, thereby initiating an operation of the in-vehicle device, usually the user vocalizes a defined command word, thereby performs a voice operation.

Note that, in a case where the user does not remember command words or in a case where an environment or a condition of vocalization causes voice recognition to fail, a situation in which the user repeatedly vocalizes a word other than the command words may occur. Therefore, it is desirable that, by detecting that the user repeatedly vocalizes the same word, the user is notified thereof. An example of a conventional technology for detecting a repetition of the same vocalization will be described.

As an example of the conventional technology, there is a technology in which, by using a large-sized word dictionary having a volume of vocabulary corresponding to 1700 or more words, processing for determining a word similar to voice information vocalized by a user is sequentially performed and individual determined words are compared, thereby detecting a repetition of the same vocalization.

However, the conventional technology is based on an assumption that the large-sized word dictionary is used, and it is not appropriate to install the large-sized word dictionary in an apparatus such as an in-vehicle device, which uses command words small in size. In addition, in the conventional technology, in a case where a system is constructed by using a small-sized word dictionary, it becomes difficult to determine a word similar to voice information vocalized by a user. In contrast, there is an attempt to detect a repetition of the same vocalization without using a large-sized word dictionary.

In another conventional technology, there is repeatedly performed processing for detecting and registering, from voice information vocalized by a user, feature parameters of voice information that does not fit with a word dictionary. In addition, the feature parameters of voice information that does not fit with the word dictionary and already registered feature parameters are subjected to dynamic programming (DP) matching, thereby detecting a repetition of the same vocalization. As feature parameters of voice information, MEL frequency cepstral coefficients (MFCC) are used, for example.

As examples of the related art, Japanese Laid-open Patent Publication No. 62-173498 and Japanese Laid-open Patent Publication No. 2002-6883 are known.

SUMMARY

According to an aspect of the invention, an apparatus for voice recognition includes: a memory; processor coupled to the memory and configured to execute a transformation operation that includes transforming voice information into a phoneme sequence expressed by characters of individual phonemes corresponding to feature parameters of the voice information, execute a collation operation that includes determining, based on a first likelihood and a second likelihood, whether or not collation succeeds, the first likelihood being based on the feature parameters of the voice information and the phoneme sequence, and a second likelihood being based on the feature parameters of the voice information and a phoneme sequence of a predetermined keyword, execute a matching operation that includes associating, based on a collation result, individual phonemes of the phoneme sequence of the voice information at a time of a failure of collation and individual phonemes of a phoneme sequence of previous voice information with each other, and execute a determination operation that includes determining, based on a result of the association, whether or not the phoneme sequence of the voice information is based on repetitive vocalization.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of phoneme group data;

FIG. 6 is a diagram illustrating an example of a data structure of a guidance table;

DESCRIPTION OF EMBODIMENTS

In the above-mentioned conventional technologies, there is a problem that it is difficult to detect a repetition of the same vocalization without increasing a processing load.

In one of the conventional technologies, a method in which a large-sized word dictionary does not have to be used is proposed, for example. However, a large amount of information is included in the feature parameters of voice information, and in a case of using the feature parameters without change, thereby performing the DP matching, a processing amount becomes large.

As one aspect of the present embodiment, provided are solutions for being able to detect repetitive vocalization by using a tentative character string without increasing a processing load even in a case where recognition vocabulary is small in size, for example.

Hereinafter, embodiments of a voice recognition apparatus, a voice recognition method, and a voice recognition program disclosed in the present application will be described in detail, based on drawings. Note that the embodiments do not limit the present technology.

First Embodiment

Figure 1:
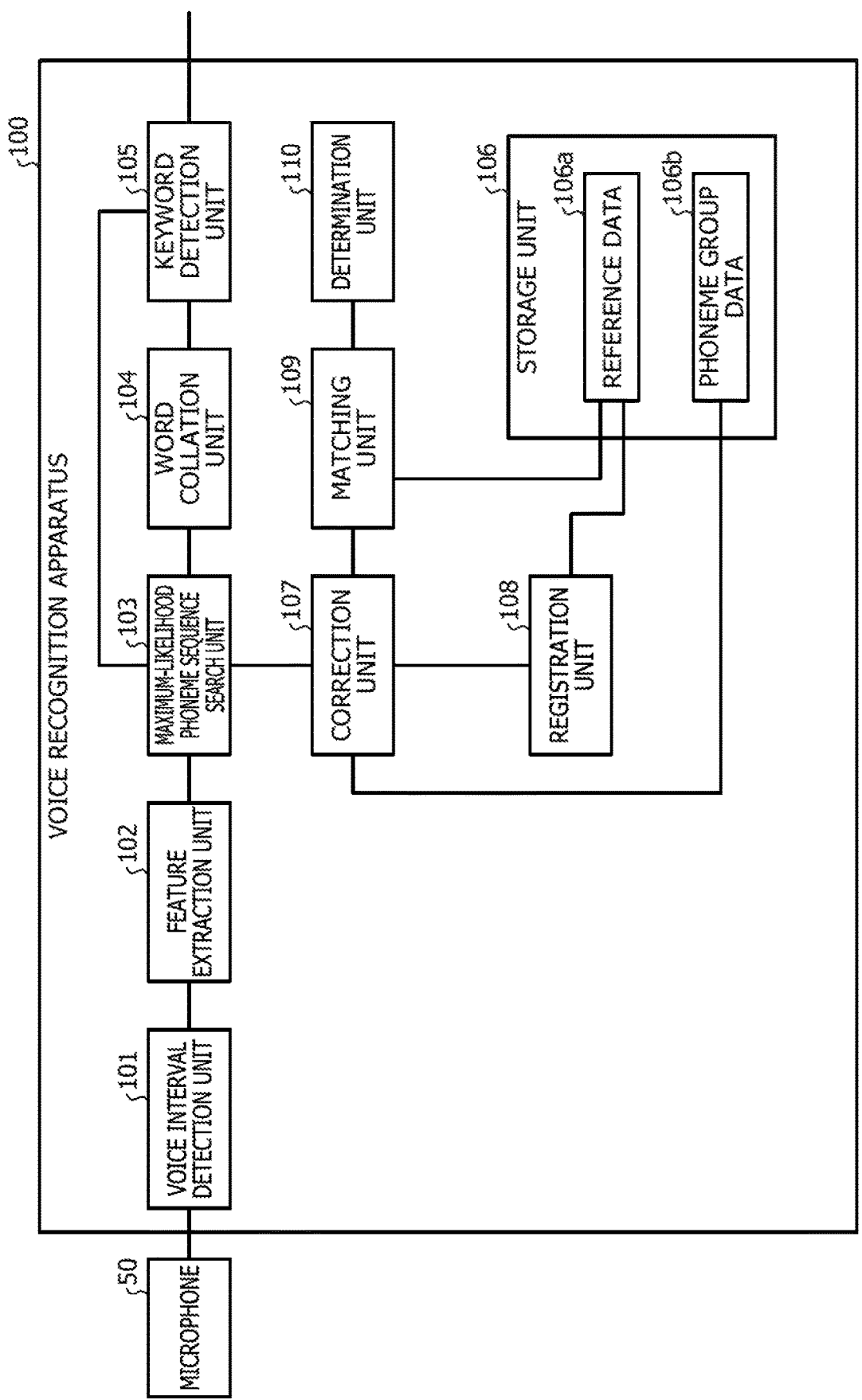
FIG. 1 is a functional block diagram illustrating a configuration of a voice recognition apparatus according to the present first embodiment.

FIG. 1 is a functional block diagram illustrating a configuration of a voice recognition apparatus according to the present first embodiment. As illustrated in FIG. 1, this voice recognition apparatus 100 is connected to a microphone 50. While an illustration is omitted, the voice recognition apparatus 100 is installed in a vehicle or the like, driven by a user, and is connected to a car navigation system.

The microphone 50 is installed in the vehicle or the like. The microphone 50 collects sounds in the vehicle and outputs information of the collected sounds to the voice recognition apparatus 100. In the following description, information of sounds is also called voice information.

The voice recognition apparatus 100 includes a voice interval detection unit 101, a feature extraction unit 102, a maximum-likelihood phoneme sequence search unit 103, a word collation unit 104, a keyword detection unit 105, a storage unit 106, a correction unit 107, a registration unit 108, a matching unit 109, and a determination unit 110. The maximum-likelihood phoneme sequence search unit 103 is an example of a transformation unit. The word collation unit 104 and the keyword detection unit 105 are an example of a collation unit.

The voice interval detection unit 101 is a processing unit that acquires voice information from the microphone 50 and that detects a voice interval included in the voice information. The voice interval detection unit 101 outputs, to the feature extraction unit 102, information of the voice interval and the voice information.

Based on, for example, amplitudes and zero crossings of the voice information, the voice interval detection unit 101 detects the voice interval. The voice interval detection unit 101 defines, as a starting point of the voice interval, a timing at which the number of zero crossings exceeds a given number for an amplitude that exceeds a given level. In addition, in a case where an interval during which the number of zero crossings is less than the given number for an amplitude that exceeds the given level continues for a predetermined period of time, the voice interval detection unit 101 regards as termination of the voice interval and defines, as an ending point, a time when the number of zero crossings becomes less than the given number. The voice interval detection unit 101 repeatedly performs the above-mentioned processing, thereby detecting the voice interval. Note that the voice interval detection unit 101 may detect the voice interval by using a Gaussian mixture distribution model or the like.

The feature extraction unit 102 is a processing unit that extracts feature parameters from the voice information of the voice interval. The feature extraction unit 102 outputs information of the feature parameters to the maximum-likelihood phoneme sequence search unit 103. Feature amounts extracted by the feature extraction unit 102 are MEL frequency cepstral coefficients (MFCC), and ΔMFCC and ΔΔMFCC that each serve as a dynamic feature of the MFCC, for example.

The feature extraction unit 102 performs, for example, the following processing, thereby extracting feature parameters. The feature extraction unit 102 cuts out the voice information of the voice interval by a frame having a predetermined length, multiplies by a window function, and performs Fourier transform, thereby obtaining a logarithmic amplitude spectrum. The feature extraction unit 102 multiplies the logarithmic amplitude spectrum by filter banks (called Mel filter banks) in which center frequencies thereof are arranged at regular intervals on a Mel frequency axis, and the feature extraction unit 102 performs discrete cosine transform (DCT) on each of filter bank outputs thereof, thereby obtaining, as feature parameters (MFCC), low-order values of the DCT, which exclude a zero-order value. Note that the feature extraction unit 102 may perform other processing, thereby extracting feature parameters from the voice information of the voice interval.

Based on an acoustic model and the feature parameters of the voice information, the maximum-likelihood phoneme sequence search unit 103 searches for a phoneme corresponding to the feature parameters. The acoustic model is, for example, a monophone model obtained by learning by using feature parameters for which center phonemes coincide with each other regardless of differences between preceding phonemes and subsequent phonemes. In addition, the acoustic model is a triphone model obtained by learning by using a corresponding feature parameter for each of pairs of preceding phonemes and subsequent phonemes. Based on a search result obtained by using the monophone model, the maximum-likelihood phoneme sequence search unit 103 estimates a most likely phoneme sequence (a maximum-likelihood phoneme sequence) included in the feature parameters of the voice information. The phoneme sequence includes a phoneme of a vowel, a phoneme of a consonant, a phoneme of a semivowel, a phoneme of a long vowel, a phoneme indicating silence immediately before a word, a phoneme indicating silence immediately after a word, and a phoneme indicating a short pause or the like. The maximum-likelihood phoneme sequence search unit 103 outputs information of the maximum-likelihood phoneme sequence to the word collation unit 104 and the correction unit 107. In addition, the maximum-likelihood phoneme sequence search unit 103 outputs the feature parameters of the voice information to the word collation unit 104.

The maximum-likelihood phoneme sequence search unit 103 estimates that the voice information of "295 (nii, kyu, go)" includes a phoneme sequence of "sp i i: i: silE ky u u: o o: N k o o: sp", for example.

The word collation unit 104 is a processing unit that performs collation processing illustrated in the following description, thereby determining whether or not a predetermined keyword is included in voice information. The word collation unit 104 outputs a collation result to the keyword detection unit 105.

An example of the collation processing performed by the word collation unit 104 will be described. Based on the above-mentioned triphone models, which each correspond to a combination of phonemes of a corresponding one of words defined in a word dictionary, and the feature parameters of the voice information, the word collation unit 104 individually calculates a likelihood for the combination of phonemes of each of the words.

In addition, based on the feature parameters of the voice information and individual phonemes of the maximum-likelihood phoneme sequence, the word collation unit 104 multiplies by individual probabilities that the respective phonemes are included in the voice information, thereby calculating a likelihood for the maximum-likelihood phoneme sequence. In the following description, a likelihood for a combination of phonemes of each of the words defined in the word dictionary is also arbitrarily called a first likelihood, and a likelihood for the maximum-likelihood phoneme sequence is also arbitrarily called a second likelihood. Note that, in view of a calculation speed, it is assumed that each of the first likelihood and the second likelihood is a logarithmic likelihood obtained by multiplying a likelihood by a logarithm.

For, for example, each of the first likelihoods, the word collation unit 104 calculates a difference between the relevant first likelihood and the second likelihood, thereby determining whether or not one of the first likelihoods, for which a difference is less than a threshold value, exists. In a case where none of the first likelihoods, for which a difference is less than the threshold value, exists, the word collation unit 104 determines a failure of collation. On the other hand, in a case where one of the first likelihoods, for which a difference is less than the threshold value, exists, the word collation unit 104 selects the first likelihood that is closest to the second likelihood and that is included in the first likelihoods for which respective differences are less than the threshold value, and the word collation unit 104 outputs, as a collation result, a word corresponding to the selected first likelihood, to the keyword detection unit 105.

Note that, in a case where, in a search stage in the middle of calculating, based on triphones of combinations of phonemes of words and the feature parameters of the voice information, a maximum-likelihood path, it is confirmed that a final likelihood becomes less than a threshold value, the word collation unit 104 terminates calculation of a likelihood and determines a failure of collation.

In a case where the collation based on the word collation unit 104 succeeds and a collation result is acquired, the keyword detection unit 105 notifies the car navigation system or the like of information of a word, which serves as the collation result. On the other hand, in a case of acquiring information to the effect that collation based on the word collation unit 104 fails, the keyword detection unit 105 outputs, to the maximum-likelihood phoneme sequence search unit 103, a control instruction for outputting, to the matching unit 109 via the correction unit 107, a maximum-likelihood phoneme sequence for which the matching fails. In a case of acquiring the above-mentioned control instruction from the keyword detection unit 105, the maximum-likelihood phoneme sequence search unit 103 outputs, to the matching 109 via the correction unit 107, information of the maximum-likelihood phoneme sequence at a time of the failure of the collation.

The storage unit 106 includes a reference data 106a and a phoneme group data 106b. The storage unit 106 corresponds to a semiconductor memory element such as a random access memory (RAM), a read only memory (ROM), or a flash memory or a storage device such as a hard disk drive (HDD).

The reference data 106a is data holding information of phoneme sequences previously searched for by the maximum-likelihood phoneme sequence search unit 103. After being corrected by the after-mentioned correction unit 107, the phoneme sequences are registered in the reference data 106a by the registration unit 108.

The phoneme group data 106b is information for associating a group of similar phonemes and a phoneme representative of this phoneme group with each other. FIG. 2 is a diagram illustrating an example of a data structure of phoneme group data. As illustrated in FIG. 2, this phoneme group data 106b associates a replacement rule, a phoneme group, and a representative phoneme with one another. The replacement rule is information for uniquely identifying a pair of a phoneme group and a representative phoneme. The phoneme group indicates phonemes included in the same group. The same phoneme group includes similar phonemes. The representative phoneme indicates a representative phoneme out of phonemes included in the same phoneme group.

A record of, for example, the first row of the phoneme group data 106b will be described. The phoneme group of the replacement rule of "1" corresponds to "s, z", and the representative phoneme is "s".

The correction unit 107 is a processing unit that corrects, based on the phoneme group data 106b, a phoneme sequence acquired from the maximum-likelihood phoneme sequence search unit 103. In addition, the correction unit 107 performs correction for deleting a predetermined phoneme included in the phoneme sequence. In the following description, processing for correcting based on the phoneme group data 106b is also arbitrarily called first correction processing, and the correction for deleting the predetermined phoneme is also arbitrarily called second correction processing.

The first correction processing will be described. From among phoneme sequences acquired from the maximum-likelihood phoneme sequence search unit 103, the correction unit 107 detects a phoneme included in a phoneme group of the phoneme group data 106b and repeatedly performs processing for transforming the detected phoneme to a representative phoneme.

It is assumed that a phoneme sequence acquired from the maximum-likelihood phoneme sequence search unit 103 is "sp i i: k silE silE ky u u: o o: N o sp g o sp", for example. In a case where the correction unit 107 compares this phoneme sequence and phoneme groups of the phoneme group data 106b with each other, "k, g" included in the individual phonemes correspond to the replacement rule of "5". Since the representative phoneme of the phoneme group of "k, g" is "k", the correction unit 107 performs correction for transforming the phoneme of "g" to "k". The correction unit 107 corrects the phoneme sequence of "sp i i: k silE silE ky u u: o o: N o sp g o sp" to the phoneme sequence of "sp i i: k silE silE ky u u: o o: N o sp k o sp", for example.

Subsequently, the second correction processing will be described. Predetermined phonemes to serve as deletion targets include a phoneme of "silB" indicating silence immediately before a word, a phoneme of "silE" indicating silence immediately after a word, and a phoneme of "sp" indicating a short pause.

It is assumed that a phoneme sequence is "sp i i: k silE silE ky u u: o o: N o sp k o sp", for example. The correction unit 107 performs correction for deleting "silE" and "sp" included in this phoneme sequence. A phoneme sequence after the correction is the phoneme sequence of "i i: k ky u u: o o: N o k o".

The correction unit 107 performs the first correction processing and the second correction processing on the phoneme sequence acquired from the maximum-likelihood phoneme sequence search unit 103 and outputs information of the corrected phoneme sequence to the registration unit 108. Note that, regarding a phoneme sequence for which an instruction to output it to the matching unit 109 is received from the maximum-likelihood phoneme sequence search unit 103, the correction unit 107 outputs information of the corrected phoneme sequence to the matching unit 109.

The registration unit 108 is a processing unit that acquires the corrected phoneme sequence from the correction unit 107 and that registers the acquired phoneme sequence in the reference data 106a. The registration unit 108 registers the latest phoneme sequence in the reference data 106a and determines whether or not the number of sets of phoneme sequences registered in the reference data 106a is greater than or equal to a threshold value. In a case where the number of sets of phoneme sequences registered in the reference data 106a is greater than or equal to the threshold value, the registration unit 108 deletes the oldest phoneme sequence from the reference data 106a.

The matching unit 109 is a processing unit that calculates a coincidence rate between a phoneme sequence that is acquired from the correction unit 107 and for which collation fails and each of sets of phoneme sequences registered in the reference data 106a. The matching unit 109 outputs information of coincidence rates to the determination unit 110. Note that phoneme sequences for each of which collation fails include a phoneme sequence in a case where, in a stage in the middle of calculating a likelihood, it is confirmed that a final likelihood becomes less than the threshold value.

Here, an example of processing in the matching unit 109 will be described. In the following description, for convenience of explanation, a phoneme sequence acquired from the correction unit 107 is also called a first phoneme sequence. In addition, a set of phoneme sequences in the reference data 106a is also called a second phoneme sequence.

The matching unit 109 acquires, from the reference data 106a, a second phoneme sequence not selected and performs dynamic programming (DP) matching between one of the first phoneme sequences and the corresponding one of the second phoneme sequences. The matching unit 109 compares each of phonemes of the corresponding one of the first phoneme sequences and each of phonemes of the corresponding one of the second phoneme sequences and associates coincident phonemes, for example. As a method for associating, ordinal numbers are assigned to each of the corresponding one of the first phoneme sequences and the corresponding one of the second phoneme sequences, starting from the top thereof, and absolute values of differences in ordinal numbers between associated phonemes are calculated as distances, thereby calculating, based on the DP matching, an association having the shortest distance, for example. In a case where the number of phonemes of the corresponding one of the first phoneme sequences is greater than the number of phonemes of the corresponding one of the second phoneme sequences, there may occur a phoneme that is included in the phonemes of the corresponding one of the first phoneme sequences and that is associated with none of phonemes of the corresponding one of the second phoneme sequences.

The matching unit 109 performs the above-mentioned matching processing, thereby classifying the individual phonemes of the corresponding one of the first phoneme sequences into first phonemes, second phonemes, and third phonemes. The first phonemes are phonemes that each coincide with one of the phonemes of the second phoneme sequence. The second phonemes are phonemes that are each associated with one of the phonemes of the second phoneme sequences and that are each different from the relevant associated phoneme. The third phonemes are phonemes associated with none of the phonemes of the second phoneme sequences.

Based on Expression (1), the matching unit 109 calculates a coincidence rate P between a corresponding one of the first phoneme sequences and a corresponding one of the second phoneme sequences. In the following description, the coincidence rate P between a corresponding one of the first phoneme sequences and a corresponding one of the second phoneme sequences is also called a coincidence rate of the corresponding one of the first phoneme sequence or a coincidence rate. In Expression (1), "C" indicates the number of the first phonemes. "S" indicates the number of the second phonemes. "D" indicates the number of the third phonemes.

$$\text{Coincidence Rate } P = C/(C+D+S) \times 100(\%) \tag{1}$$

In a case of acquiring one of the first phoneme sequences, the matching unit 109 acquires, from the reference data 106a, the second phoneme sequences not selected and repeatedly performs processing for calculating coincidence rates, thereby outputting information of each of the coincidence rates to the determination unit 110. Note that the matching unit 109 may calculate, regarding the same first phoneme sequence, a coincidence rate for each of the second phoneme sequences and may output, to the determination unit 110, information of a maximum coincidence rate out of the individual calculated coincidence rates.

It is assumed that one of the first phoneme sequences is "i i: k ky u u: o o: N o k o" and one of the second phoneme sequences is "i i: i: ky u u: o o: N k o o:", for example. In this case, "C"=11, "D"=1, and "S"=0 are satisfied, and in a case where the matching unit 109 calculates, based on Expression (1), a coincidence rate, the coincidence rate P=80% turns out to be satisfied.

The determination unit 110 is a processing unit that determines, based on a matching result of the matching unit 109, whether or not one of the first phoneme sequences is based on repetitive vocalization. In a case where it is determined that the relevant first phoneme sequence is based on repetitive vocalization, the determination unit 110 notifies the car navigation system or the like of information to the effect that the repetitive vocalization is detected.

In a case where information related to a coincidence rate of one of the first phoneme sequences is acquired from the matching unit 109 and the coincidence rate is greater than or equal to a threshold value, the determination unit 110 determines that the relevant first phoneme sequence is based on the repetitive vocalization, for example.

Figure 3:
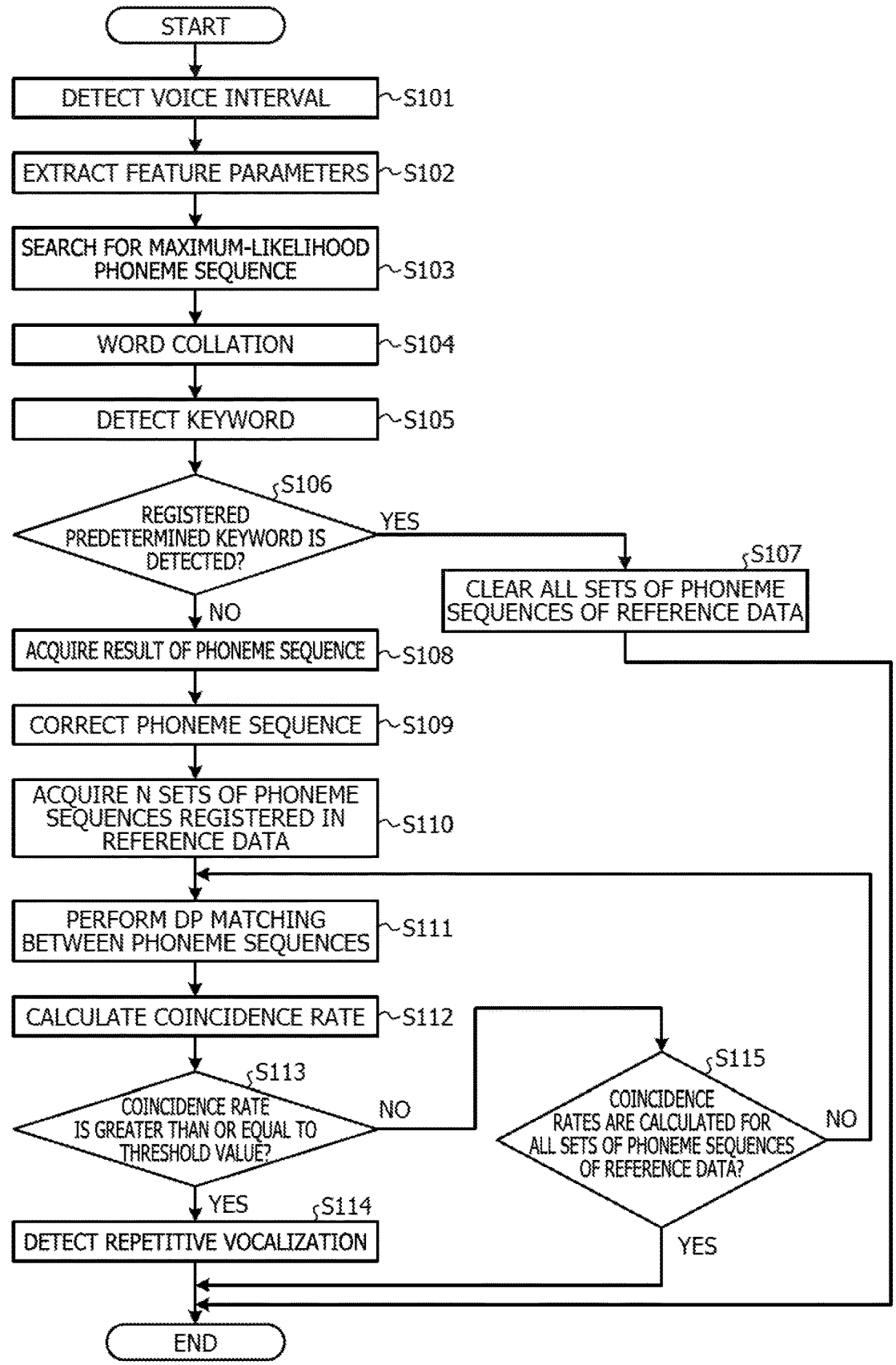
FIG. 3 is a flowchart illustrating a procedure of processing in the voice recognition apparatus according to the present first embodiment.

Next, a procedure of processing in the voice recognition apparatus 100 according to the present first embodiment will be described. FIG. 3 is a flowchart illustrating a procedure of processing in the voice recognition apparatus according to the present first embodiment. As illustrated in FIG. 3, the voice interval detection unit 101 in this voice recognition apparatus 100 detects a voice interval of voice information (step S101). The feature extraction unit 102 in the voice recognition apparatus 100 extracts feature parameters (step S102).

The maximum-likelihood phoneme sequence search unit 103 in the voice recognition apparatus 100 searches for a maximum-likelihood phoneme sequence (step S103). The word collation unit 104 in the voice recognition apparatus 100 performs word collation, based on the feature parameters of the voice information (step S104). The keyword detection unit 105 in the voice recognition apparatus 100 performs detection of a keyword, based on a word collation result (step S105).

In a case where a registered predetermined keyword is detected (step S106: Yes), the keyword detection unit 105 clears all sets of phoneme sequences of the reference data 106a (step S107) and terminates the processing. On the other hand, in a case where no registered predetermined keyword is detected (step S106: No), the keyword detection unit 105 makes a transition to step S108.

The correction unit 107 in the voice recognition apparatus 100 acquires a result of a phoneme sequence (step S108) and corrects the phoneme sequence (step S109). The matching unit 109 in the voice recognition apparatus 100 acquires N sets of phoneme sequences registered in the reference data 106a (step S110).

The matching unit 109 performs DP matching between phoneme sequences (step S111) and calculates a coincidence rate (step S112). The determination unit 110 in the voice recognition apparatus 100 determines whether or not the coincidence rate is greater than or equal to the threshold value (step S113).

In a case where the coincidence rate is greater than or equal to the threshold value (step S113: Yes), the determination unit 110 detects repetitive vocalization (step S114) and terminates the processing. On the other hand, in a case where the coincidence rate is less than the threshold value (step S113: No), the determination unit 110 determines whether or not coincidence rates are calculated for all the sets of phoneme sequences of the reference data 106a (step S115).

In a case where coincidence rates are calculated for all the sets of phoneme sequences of the reference data 106a (step S115: Yes), the determination unit 110 terminates the processing. On the other hand, in a case where coincidence rates are not calculated for all the sets of phoneme sequences of the reference data 106a (step S115: No), the determination unit 110 makes a transition to step S111.

Figure 4:
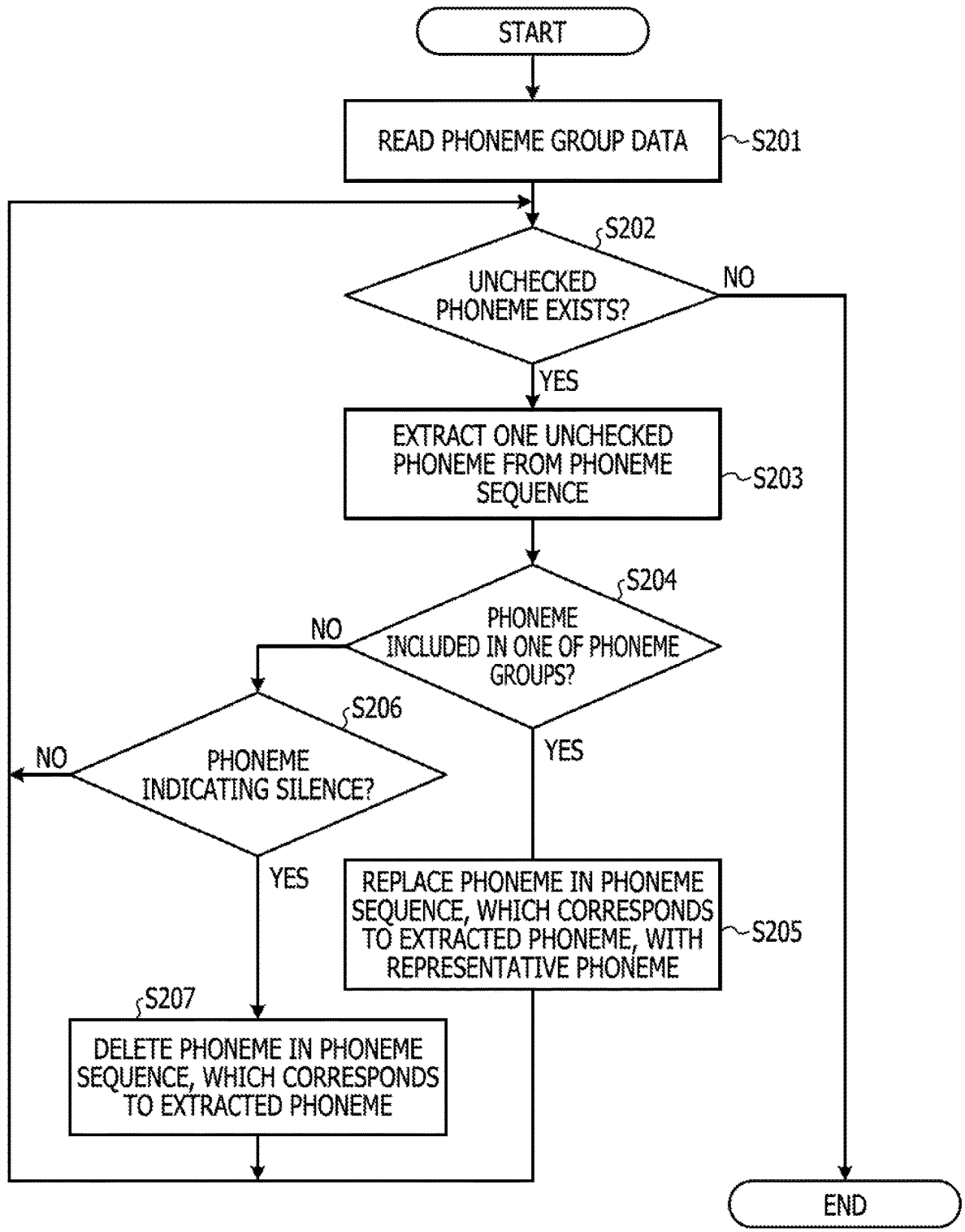
FIG. 4 is a flowchart illustrating a procedure of processing for correcting a phoneme sequence.

Next, a processing procedure of processing for correcting a phoneme sequence, illustrated in step S109 in FIG. 3, will be described. FIG. 4 is a flowchart illustrating a procedure of processing for correcting a phoneme sequence. As illustrated in FIG. 4, the correction unit 107 in the voice recognition apparatus 100 reads the phoneme group data 106b (step S201). The correction unit 107 determines whether or not an unchecked phoneme exists (step S202). In a case where no unchecked phoneme exists (step S202: No), the correction unit 107 terminates the processing.

In a case where an unchecked phoneme exists (step S202: Yes), the correction unit 107 extracts one unchecked phoneme from the phoneme sequence (step S203). The correction unit 107 determines whether or not the relevant extracted phoneme is a phoneme included in one of phoneme groups (step S204). In a case where the relevant extracted phoneme is a phoneme included in one of the phoneme groups (step S205: Yes), the correction unit 107 replaces a phoneme in the phoneme sequence, which corresponds to the extracted phoneme, with a representative phoneme (step S205) and makes a transition to step S202.

On the other hand, in a case where the relevant extracted phoneme is not a phoneme included in the phoneme groups (step S204: No), the correction unit 107 determines whether or not the phoneme is a phoneme indicating silence (step S206). In a case where the phoneme is no phoneme indicating silence (step S206: No), the correction unit 107 makes a transition to step S202 while adding no correction to the extracted phoneme. On the other hand, in a case where the phoneme is a phoneme indicating silence (step S206: Yes), the correction unit 107 deletes a phoneme in the phoneme sequence, which corresponds to the extracted phoneme, (step S207) and makes a transition to step S202.

Next, advantageous effects of the voice recognition apparatus 100 according to the present first embodiment will be described. The voice recognition apparatus 100 registers, in the reference data 106a, phoneme sequences generated in a processing process of word spotting. In addition, the voice recognition apparatus 100 sequentially detects a phoneme sequence that does not fit with the word dictionary or for which keyword detection fails, and the voice recognition apparatus 100 performs DP matching between phonemes of a detected phoneme sequence and phoneme sequences configuring sets of phoneme sequences of the reference data 106a, thereby detecting repetitive pronunciation, based on the degrees of coincidence of the phonemes for each of the sets of phoneme sequence. Since, in the present first embodiment, the DP matching is performed based on phoneme sequences searched for by using feature parameters, it is possible to reduce a processing amount, compared with a case where the DP matching is performed based on feature parameters. In addition, even in a case where a large number of words are not registered in the word dictionary, it is possible to detect repetitive vocalization.

Based on phoneme sequences and the phoneme group data 106b, the voice recognition apparatus 100 performs processing for correcting, to a representative phoneme, a phoneme corresponding to one of phoneme groups. In this way, a similar phoneme is corrected to the same phoneme, thereby enabling a coincidence rate to be accurately calculated.

The voice recognition apparatus 100 performs correction for deleting a phoneme that is included in a phoneme sequence and that indicates silence. The number of detected phonemes indicating silence greatly varies for each of vocalization operations and is unstable, depending on the speed of vocalization, how to pause, and so forth, and furthermore, phonemes indicating silence each have less useful information for detecting repetitive vocalization. Therefore, consideration of phonemes indicating silence badly influences at a time of calculating the degree of coincidence of a phoneme. Therefore, by performing correction for deleting phonemes each indicating silence, it is possible to accurately calculate a coincidence rate.

Second Embodiment

Figure 5:
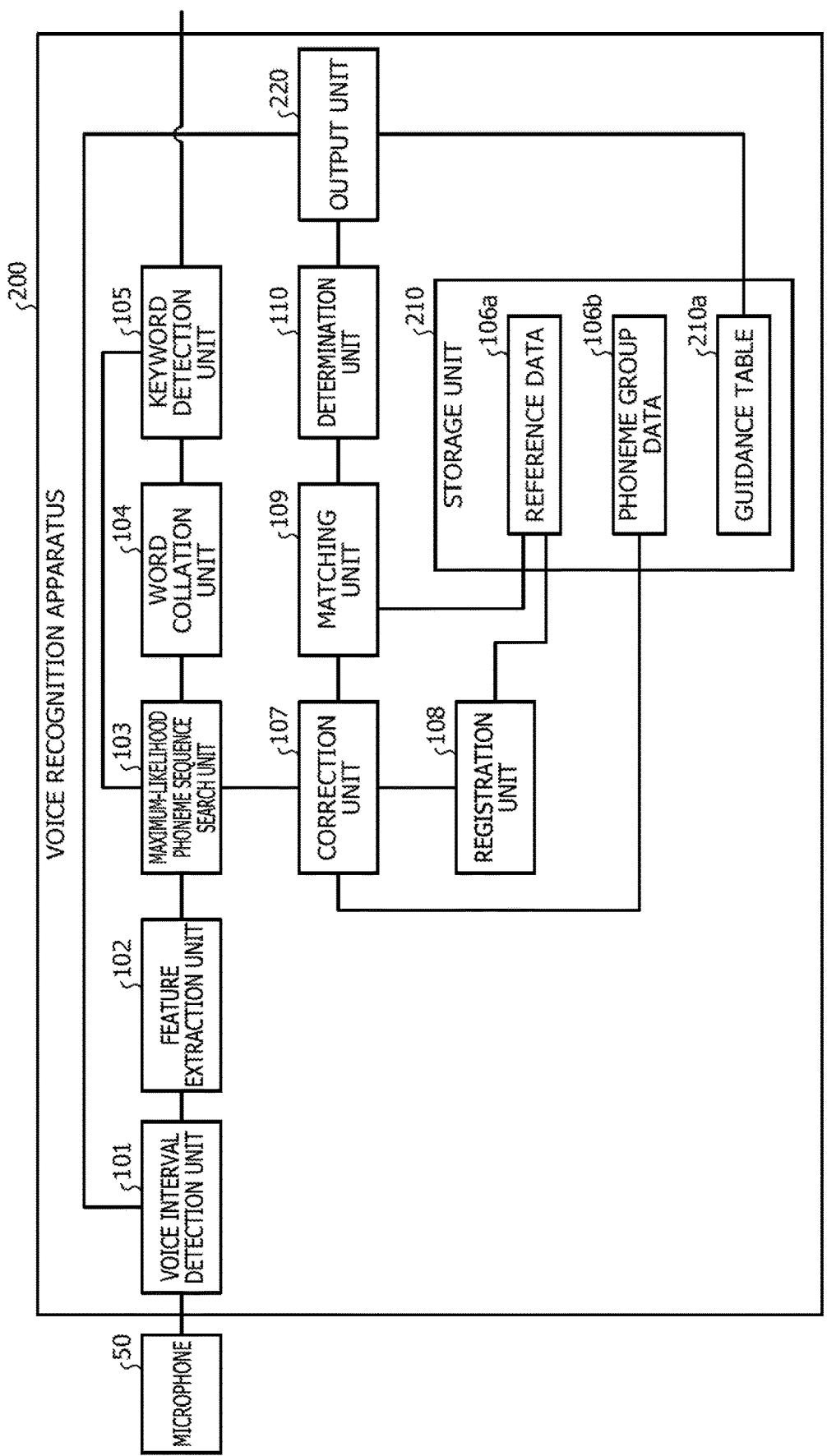
FIG. 5 is a functional block diagram illustrating a configuration of a voice recognition apparatus according to the present second embodiment.

FIG. 5 is a functional block diagram illustrating a configuration of a voice recognition apparatus according to the present second embodiment. As illustrated in FIG. 5, this voice recognition apparatus 200 is connected to a microphone 50. In the same way as the voice recognition apparatus 100, the voice recognition apparatus 200 is installed in a vehicle or the like, driven by a user, and is connected to a car navigation system. A description related to the microphone 50 is the same as the description related to the microphone 50 illustrated in FIG. 1.

The voice recognition apparatus 200 includes a voice interval detection unit 101, a feature extraction unit 102, a maximum-likelihood phoneme sequence search unit 103, a word collation unit 104, a keyword detection unit 105, a correction unit 107, a registration unit 108, a matching unit 109, a determination unit 110, a storage unit 210, and an output unit 220. Descriptions related to the respective processing units 101 to 105 and 107 to 110 in the voice recognition apparatus 200 are the same as the descriptions related to the respective processing units 101 to 105 and 107 to 110 illustrated in FIG. 1.

The storage unit 210 includes a reference data 106a, a phoneme group data 106b, and a guidance table 210a. The storage unit 210 corresponds to a semiconductor memory element such as a RAM, a ROM, or a flash memory or a storage device such as an HDD.

Descriptions related to the respective reference data 106a and phoneme group data 106b are the same as the descriptions related to the respective reference data 106a and phoneme group data 106b illustrated in FIG. 1.

The guidance table 210a is a table that holds information of guidance of which a user is to be notified in a case where repetitive vocalization is detected. FIG. 6 is a diagram illustrating an example of a data structure of a guidance table. As illustrated in FIG. 6, this guidance table 210a associates environmental information, a guidance content, and a priority order with one another.

The environmental information is information for identifying an environment of an automobile driven by the user. The guidance content is a content of guidance of which the user is to be notified, and prompts to improve an environment or a condition at a time of inputting a voice. The priority order indicates a priority order of a corresponding one of guidance contents and indicates that a priority order increases with a decrease in the value of the priority order.

In a case where the determination unit 110 determines as repetitive vocalization, the output unit 220 acquires the environmental information and determines a guidance content, based on the environmental information and the guidance table 210a. The output unit 220 causes a loud speaker, not illustrated, to output a determined guidance content.

The output unit 220 acquires the environmental information via controller area network (CAN) communication, for example. The environmental information acquired via this CAN communication includes information of whether or not an air conditioner is in a "ON" state, a traveling speed of an automobile, and information of whether or not a window of the automobile is open. In addition, the output unit 220 acquires, from the voice interval detection unit 101, information of average power of a voice interval and average power of a background noise estimated for detecting the voice interval and calculates a signal noise ratio (SNR).

The output unit 220 compares the acquired environmental information and the guidance table 210a with each other, thereby identifying fitting guidance contents, and selects a guidance content having a maximum value of the priority order from among the identified guidance contents. The output unit 220 causes the loud speaker to output the selected guidance content.

Note that, in a case where the determination unit 110 determines again as repetitive vocalization, the output unit 220 performs the above-mentioned processing again with a guidance content, not selected, as a target.

Next, a procedure of processing in the voice recognition apparatus 200 according to the present second embodiment will be described. Since a procedure of processing in which the voice recognition apparatus 200 detects repetitive vocalization is the same as the processing procedure illustrated in FIG. 3, the description thereof will be omitted. Here, processing in the output unit 220 in a case where the determination unit 110 in the voice recognition apparatus 200 detects repetitive vocalization will be described.

Figure 7:
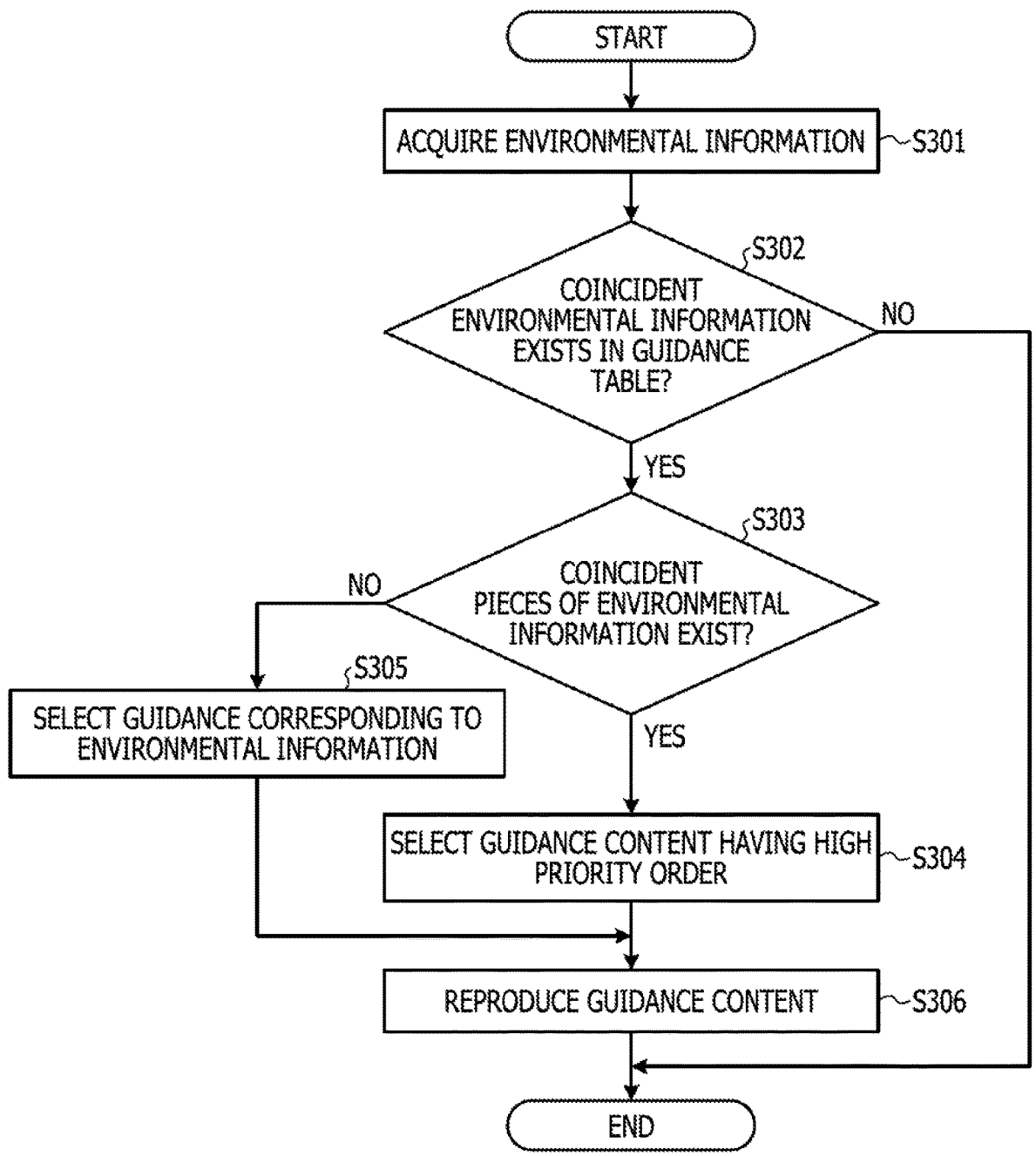
FIG. 7 is a flowchart illustrating a procedure of processing in an output unit according to the present second embodiment.

FIG. 7 is a flowchart illustrating a procedure of processing in an output unit according to the present second embodiment. As illustrated in FIG. 7, this output unit 220 acquires the environmental information (step S301) and determines whether or not coincident environmental information exists in the guidance table 210a (step S302).

In a case where no coincident environmental information exists in the guidance table 210a (step S302: No), the output unit 220 terminates the processing.

On the other hand, in a case where coincident environmental information exists in the guidance table 210a (step S302: Yes), the output unit 220 determines whether or not coincident pieces of environmental information exist (step S303).

In a case where coincident pieces of environmental information exist (step S303: Yes), the output unit 220 selects a guidance content having a high priority order (step S304) and makes a transition to step S306.

On the other hand, in a case where coincident pieces of environmental information do not exist (step S304: No), the output unit 220 selects a guidance corresponding to the environmental information (step S305) and makes a transition to step S306. The output unit 220 plays back the guidance content (step S306).

Next, advantageous effects of the voice recognition apparatus 200 according to the present second embodiment will be described. In a case where repetitive vocalization is detected, the voice recognition apparatus 200 compares the environmental information and the guidance table 210a with each other and plays back a guidance for prompting to improve an environment or a condition at a time of inputting a voice. In accordance with a content of this guidance, the user who hears this guidance improves an environment or a condition at a time of inputting a voice, thereby enabling a voice input to be appropriately performed, the voice input making voice recognition succeed.

Third Embodiment

Figure 8:
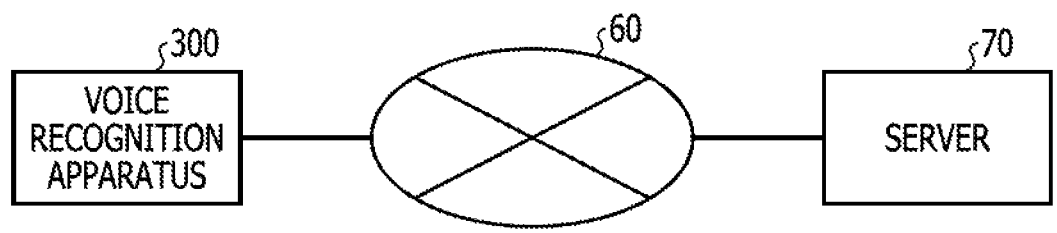
FIG. 8 is a diagram illustrating a configuration of a voice recognition system according to the present third embodiment.

FIG. 8 is a diagram illustrating a configuration of a voice recognition system according to the present third embodiment. As illustrated in FIG. 8, this voice recognition system includes a voice recognition apparatus 300 and a server 70. The voice recognition apparatus 300 is connected to the server 70 via a network 60. The server 70 may be a server on a cloud, for example.

The voice recognition apparatus 300 detects repetitive vocalization and counts the number of times being continuously detected. In the following description, it is assumed that the number of times repetitive vocalization is continuously detected is represented as the number of times of repetitive vocalization detection. In a case where the number of times of repetitive vocalization detection exceeds a threshold value, the voice recognition apparatus 300 establishes a connection with the server 70 and transmits voice information to the server 70. Feature parameters of the voice information may be transmitted in place of the voice information.

The server 70 is an apparatus that uses a word dictionary having a volume of vocabulary greater than that of a word dictionary included in the voice recognition apparatus 300, thereby performing voice recognition of the voice information transmitted by the voice recognition apparatus 300, for example. Alternatively, the server 70 is an apparatus that performs highly accurate voice recognition utilizing sufficient calculation resources in the server 70. The server 70 notifies the voice recognition apparatus 300 of a voice recognition result of the voice information.

Figure 9:
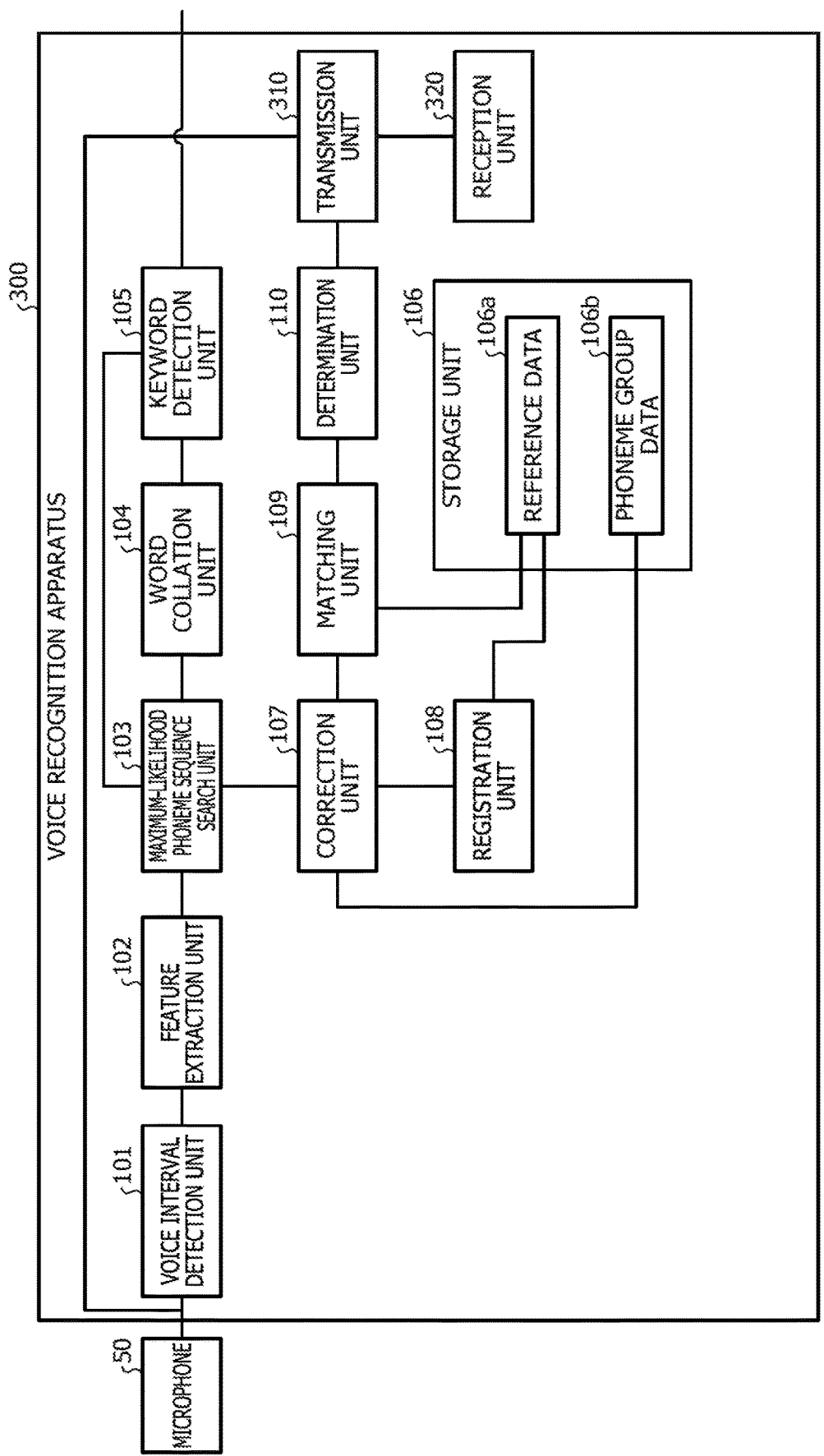
FIG. 9 is a functional block diagram illustrating a configuration of a voice recognition apparatus according to the present third embodiment.

Next, a configuration of the voice recognition apparatus 300 illustrated in FIG. 8 will be described. FIG. 9 is a functional block diagram illustrating a configuration of a voice recognition apparatus according to the present third embodiment. As illustrated in FIG. 9, this voice recognition apparatus 300 is connected to a microphone 50. In the same way as the voice recognition apparatus 100, the voice recognition apparatus 300 is installed in a vehicle or the like, driven by a user, and is connected to a car navigation system. A description related to the microphone 50 is the same as the description related to the microphone 50 illustrated in FIG. 1.

The voice recognition apparatus 300 includes a voice interval detection unit 101, a feature extraction unit 102, a maximum-likelihood phoneme sequence search unit 103, a word collation unit 104, a keyword detection unit 105, a storage unit 106, a correction unit 107, a registration unit 108, a matching unit 109, a determination unit 110, a transmission unit 310, and a reception unit 320. Descriptions related to the respective processing units 101 to 105 and 107 to 110 in the voice recognition apparatus 300 are the same as the descriptions related to the respective processing units 101 to 105 and 107 to 110 illustrated in FIG. 1. In addition, a description related to the storage unit 106 is the same as the description related to the storage unit 106 illustrated in FIG. 1.

The transmission unit 310 counts the number of times of repetitive vocalization detection in which the determination unit 110 continuously determines as repetitive vocalization. In a case where the number of times of repetitive vocalization detection exceeds a threshold value, the transmission unit 310 establishes a connection with the server 70 and transmits voice information to the server 70. The server 70 performs voice recognition on the voice information transmitted by the transmission unit 310.

The reception unit 320 is a processing unit that receives a voice recognition result of the voice information from the server 70. The reception unit 320 notifies the car navigation system or the like of the voice recognition result of the voice information.

Figure 10:
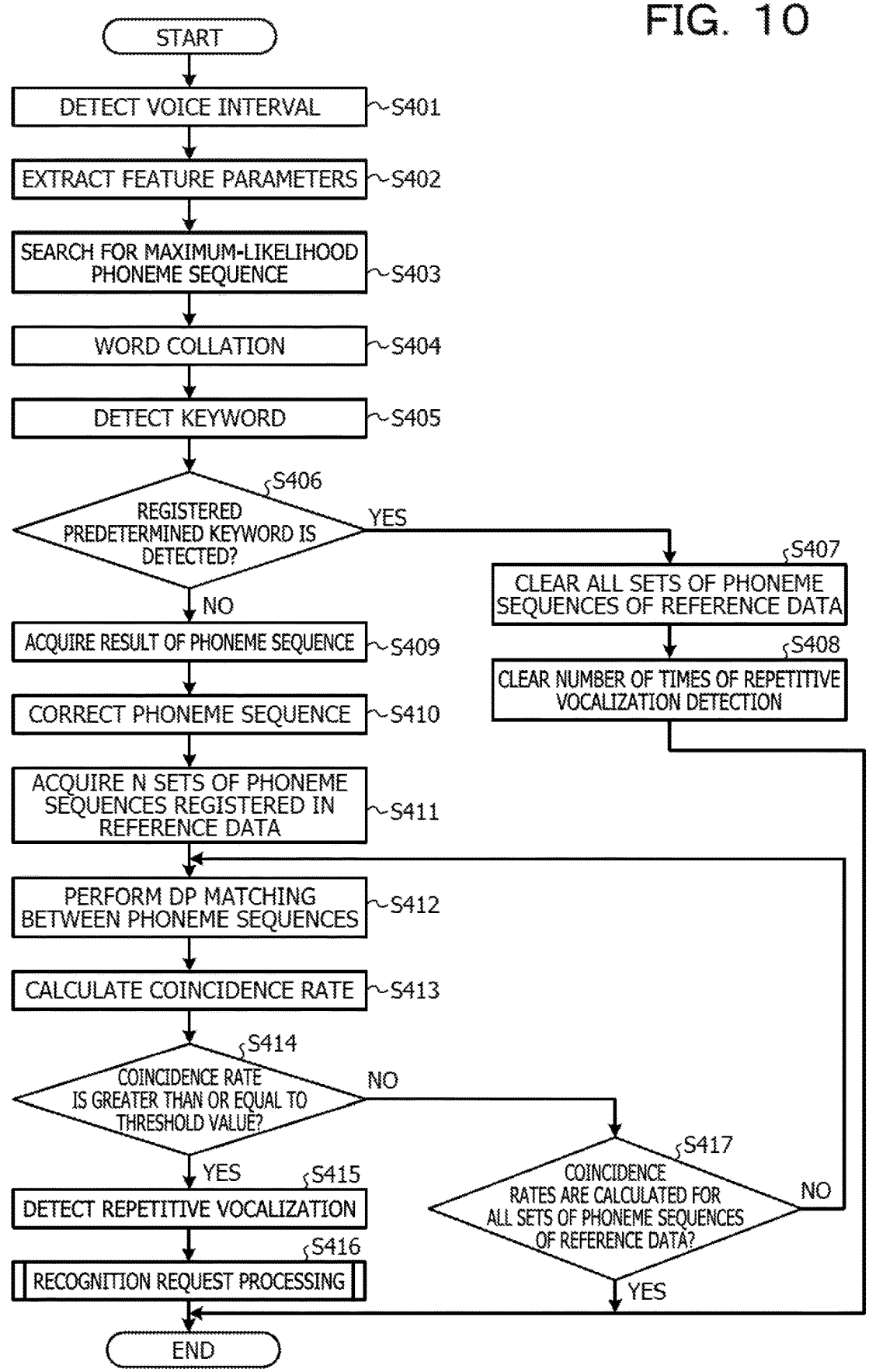
FIG. 10 is a flowchart illustrating a procedure of processing in the voice recognition apparatus according to the present third embodiment.

Next, a procedure of processing in the voice recognition apparatus 300 according to the present third embodiment will be described. FIG. 10 is a flowchart illustrating a procedure of processing in a voice recognition apparatus according to the present third embodiment. As illustrated in FIG. 10, the voice interval detection unit 101 in this voice recognition apparatus 300 detects a voice interval of voice information (step S401). The feature extraction unit 102 in the voice recognition apparatus 300 extracts feature parameters (step S402).

The maximum-likelihood phoneme sequence search unit 103 in the voice recognition apparatus 300 searches for a maximum-likelihood phoneme sequence (step S403). The word collation unit 104 in the voice recognition apparatus 300 performs word collation, based on the feature parameters of the voice information (step S404). The keyword detection unit 105 in the voice recognition apparatus 300 performs detection of a keyword, based on a word collation result (step S405).

In a case where a registered predetermined keyword is detected (step S406: Yes), the keyword detection unit 105 clears all sets of phoneme sequences of the reference data 106a (step S407). The keyword detection unit 105 clears the number of times of repetitive vocalization detection (step S408) and terminates the processing. On the other hand, in a case where no registered predetermined keyword is detected (step S406: No), the keyword detection unit 105 makes a transition to step S409.

The correction unit 107 in the voice recognition apparatus 300 acquires a result of a phoneme sequence (step S409) and corrects the phoneme sequence (step S410). The matching unit 109 in the voice recognition apparatus 300 acquires N sets of phoneme sequences registered in the reference data 106a (step S411).

The matching unit 109 performs DP matching between phoneme sequences (step S412) and calculates a coincidence rate (step S413). The determination unit 110 in the voice recognition apparatus 300 determines whether or not the coincidence rate is greater than or equal to a threshold value (step S414).

In a case where the coincidence rate is greater than or equal to the threshold value (step S414: Yes), the determination unit 110 detects repetitive vocalization (step S415), and the transmission unit 310 in the voice recognition apparatus 300 performs recognition request processing (step S416).

On the other hand, in a case where the coincidence rate is less than the threshold value (step S414: No), the determination unit 110 determines whether or not coincidence rates are calculated for all the sets of phoneme sequences of the reference data 106a (step S417).

In a case where coincidence rates are calculated for all the sets of phoneme sequences of the reference data 106a (step S417: Yes), the determination unit 110 terminates the processing. On the other hand, in a case where coincidence rates are not calculated for all the sets of phoneme sequences of the reference data 106a (step S417: No), the determination unit 110 makes a transition to step S412.

Figure 11:
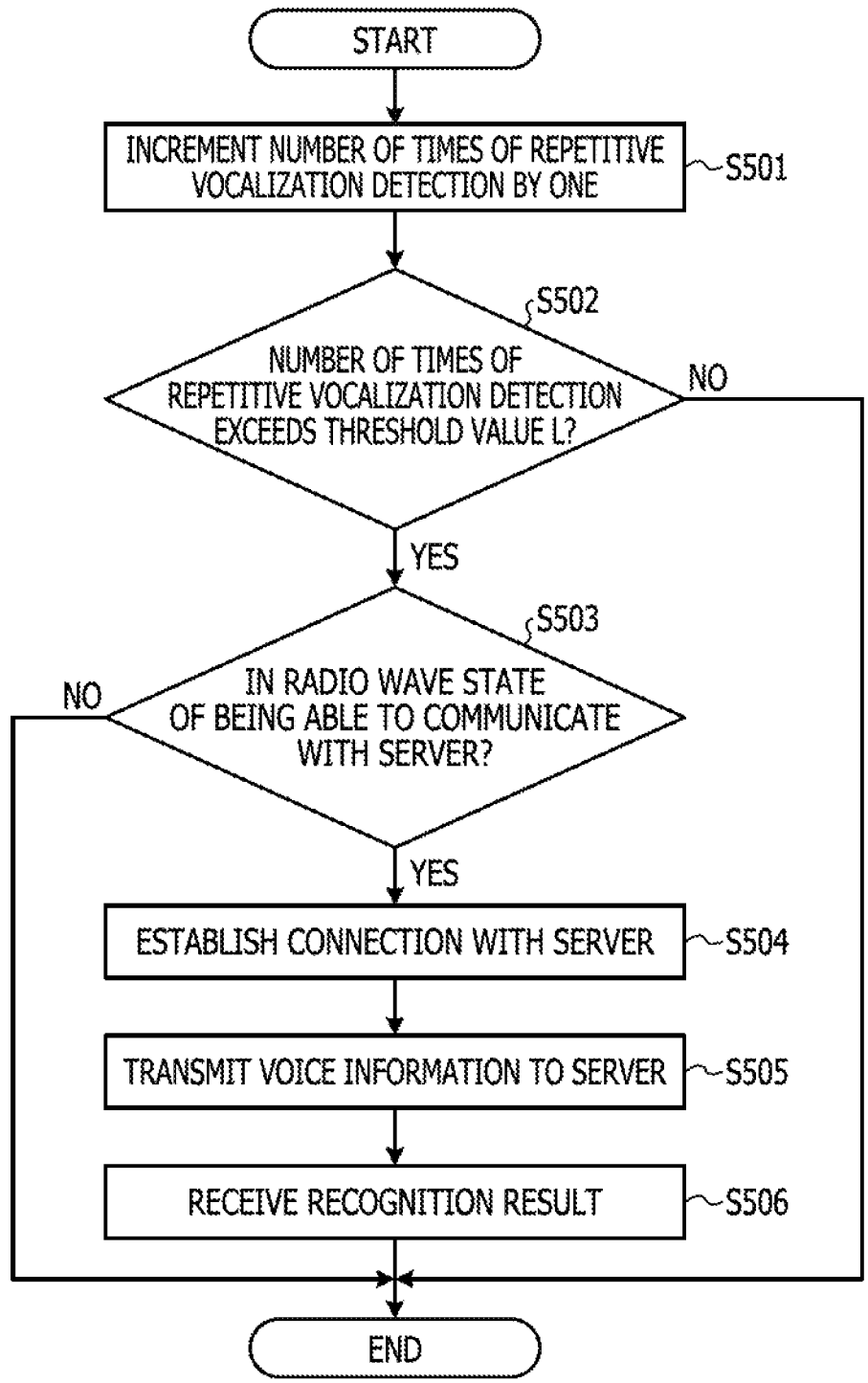
FIG. 11 is a flowchart illustrating a processing procedure of recognition request processing.

Next, a processing procedure of the recognition request processing illustrated in step S416 in FIG. 10 will be described. FIG. 11 is a flowchart illustrating a processing procedure of the recognition request processing. As illustrated in FIG. 11, the transmission unit 310 in the voice recognition apparatus 300 increments the number of times of repetitive vocalization detection by one (step S501) and determines whether or not the number of times of repetitive vocalization detection exceeds a threshold value L (step S502).

In a case where the number of times of repetitive vocalization detection does not exceed the threshold value L (step S502: No), the transmission unit 310 terminates the processing. In a case where the number of times of repetitive vocalization detection exceeds the threshold value L (step S502: Yes), the transmission unit 310 determines whether or not being in a radio wave state of being able to communicate with the server 70 (step S503).

In a case of not being in a radio wave state of being able to communicate with the server 70 (step S503: No), the transmission unit 310 terminates the processing. In a case of being in a radio wave state of being able to communicate with the server 70 (step S503: Yes), the transmission unit 310 establishes a connection with the server 70 (step S504).

The transmission unit 310 transmits voice information to the server 70 (step S505), and the reception unit 320 in the voice recognition apparatus 300 receives a recognition result from the server 70 (step S506).

Next, advantageous effects of the voice recognition apparatus 300 according to the present third embodiment will be described. In a case where the number of times of repetitive vocalization detection exceeds the threshold value, the voice recognition apparatus 300 establishes a connection with the server 70 and transmits voice information to the server 70, thereby requesting recognition processing of the voice information. For this reason, by using the server 70, it becomes possible for the voice recognition apparatus 300 to recognize voice information difficult for the voice recognition apparatus 300 itself to recognize.

Fourth Embodiment

Figure 12:
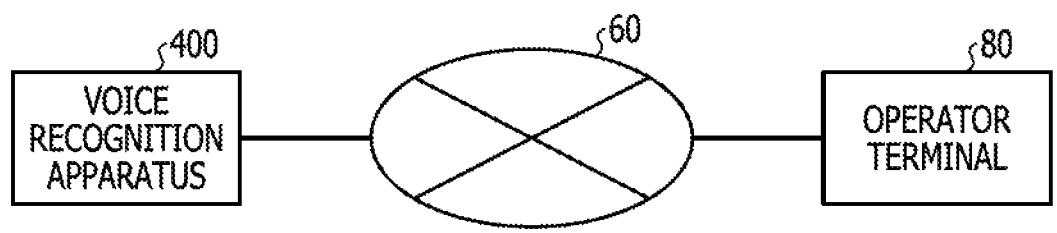
FIG. 12 is a diagram illustrating a configuration of a voice recognition system according to the present fourth embodiment.

FIG. 12 is a diagram illustrating a configuration of a voice recognition system according to the present fourth embodiment. As illustrated in FIG. 12, this voice recognition system includes a voice recognition apparatus 400 and an operator terminal 80. The voice recognition apparatus 400 is connected to the operator terminal 80 via a network 60.

The voice recognition apparatus 400 detects repetitive vocalization and counts the number of times being continuously detected. In the following description, it is assumed that the number of times repetitive vocalization is continuously detected is represented as the number of times of repetitive vocalization detection. In a case where the number of times of repetitive vocalization detection exceeds a threshold value, the voice recognition apparatus 400 calls an operator who operates the operator terminal 80, thereby establishing a telephone call path between a user in a vehicle and the operator.

The operator terminal 80 is a terminal device operated by the operator and corresponds to a personal computer (PC) or the like, equipped with a telephone call function. In a case where a communication path between the operator terminal 80 and the voice recognition apparatus 400 is established, the operator makes a telephone call with the user.

Figure 13:
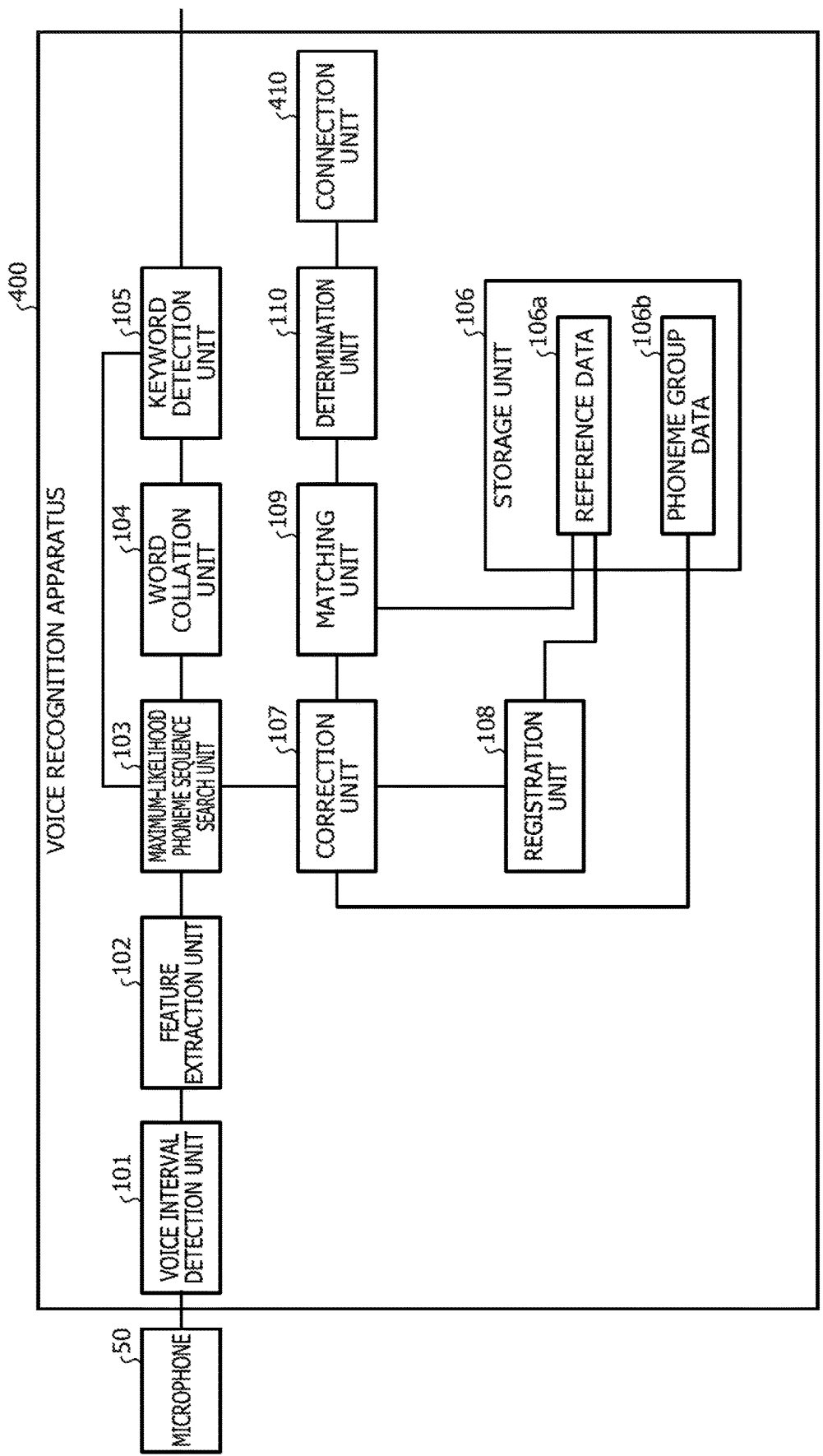
FIG. 13 is a functional block diagram illustrating a configuration of a voice recognition apparatus according to the present fourth embodiment.

Next, a configuration of the voice recognition apparatus 400 illustrated in FIG. 12 will be described. FIG. 13 is a functional block diagram illustrating a configuration of a voice recognition apparatus according to the present fourth embodiment. As illustrated in FIG. 13, this voice recognition apparatus 400 is connected to a microphone 50. In the same way as the voice recognition apparatus 100, the voice recognition apparatus 400 is installed in a vehicle or the like, driven by a user, and is connected to a car navigation system.

A description related to the microphone 50 is the same as the description related to the microphone 50 illustrated in FIG. 1.

The voice recognition apparatus 400 includes a voice interval detection unit 101, a feature extraction unit 102, a maximum-likelihood phoneme sequence search unit 103, a word collation unit 104, a keyword detection unit 105, a storage unit 106, a correction unit 107, a registration unit 108, a matching unit 109, a determination unit 110, and a connection unit 410. Descriptions related to the respective processing units 101 to 105 and 107 to 110 in the voice recognition apparatus 400 are the same as the descriptions related to the respective processing units 101 to 105 and 107 to 110 illustrated in FIG. 1. In addition, a description related to the storage unit 106 is the same as the description related to the storage unit 106 illustrated in FIG. 1.

The connection unit 410 counts the number of times of repetitive vocalization detection in which the determination unit 110 continuously determines as repetitive vocalization. In a case where the number of times of repetitive vocalization detection exceeds the threshold value, the connection unit 410 establishes a connection with the operator terminal 80. The connection unit 410 transmits voice information of the microphone 50 to the operator terminal 80 and plays back, by using a loud speaker or the like, voice information transmitted by the operator terminal 80, for example.

Figure 14:
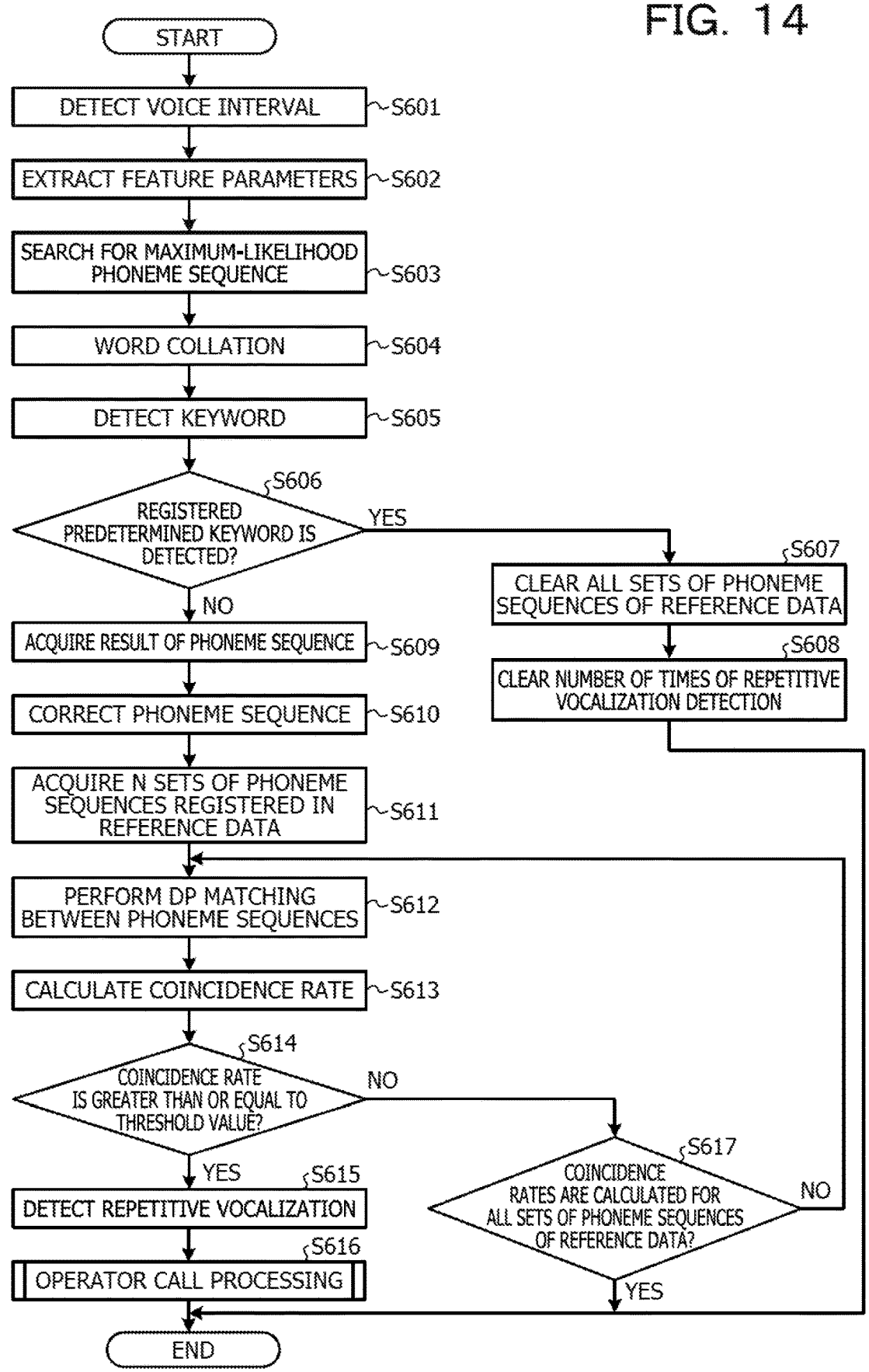
FIG. 14 is a flowchart illustrating a procedure of processing in the voice recognition apparatus according to the present fourth embodiment.

Next, a procedure of processing in the voice recognition apparatus 400 according to the present fourth embodiment will be described. FIG. 14 is a flowchart illustrating a procedure of processing in the voice recognition apparatus according to the present fourth embodiment. As illustrated in FIG. 14, the voice interval detection unit 101 in this voice recognition apparatus 400 detects a voice interval of voice information (step S601). The feature extraction unit 102 in the voice recognition apparatus 400 extracts feature parameters (step S602).

The maximum-likelihood phoneme sequence search unit 103 in the voice recognition apparatus 400 searches for a maximum-likelihood phoneme sequence (step S603). The word collation unit 104 in the voice recognition apparatus 400 performs word collation, based on the feature parameters of the voice information (step S604). The keyword detection unit 105 in the voice recognition apparatus 400 performs detection of a keyword, based on a word collation result (step S605).

In a case where a registered predetermined keyword is detected (step S606: Yes), the keyword detection unit 105 clears all sets of phoneme sequences of the reference data 106a (step S607). The keyword detection unit 105 clears the number of times of repetitive vocalization detection (step S608) and terminates the processing. On the other hand, in a case where no registered predetermined keyword is detected (step S606: No), the keyword detection unit 105 makes a transition to step S609.

The correction unit 107 in the voice recognition apparatus 400 acquires a result of a phoneme sequence (step S609) and corrects the phoneme sequence (step S610). The matching unit 109 in the voice recognition apparatus 400 acquires N sets of phoneme sequences registered in the reference data 106a (step S611).

The matching unit 109 performs DP matching between phoneme sequences (step S612) and calculates a coincidence rate (step S613). The determination unit 110 in the voice recognition apparatus 400 determines whether or not the coincidence rate is greater than or equal to a threshold value (step S614).

In a case where the coincidence rate is greater than or equal to the threshold value (step S614: Yes), the determination unit 110 detects repetitive vocalization (step S615), and the connection unit 410 in the voice recognition apparatus 400 performs operator call processing (step S616).

On the other hand, in a case where the coincidence rate is less than the threshold value (step S614: No), the determination unit 110 determines whether or not coincidence rates are calculated for all the sets of phoneme sequences of the reference data 106a (step S617).

In a case where coincidence rates are calculated for all the sets of phoneme sequences of the reference data 106a (step S617: Yes), the determination unit 110 terminates the processing. On the other hand, in a case where coincidence rates are not calculated for all the sets of phoneme sequences of the reference data 106a (step S617: No), the determination unit 110 makes a transition to step S612.

Figure 15:
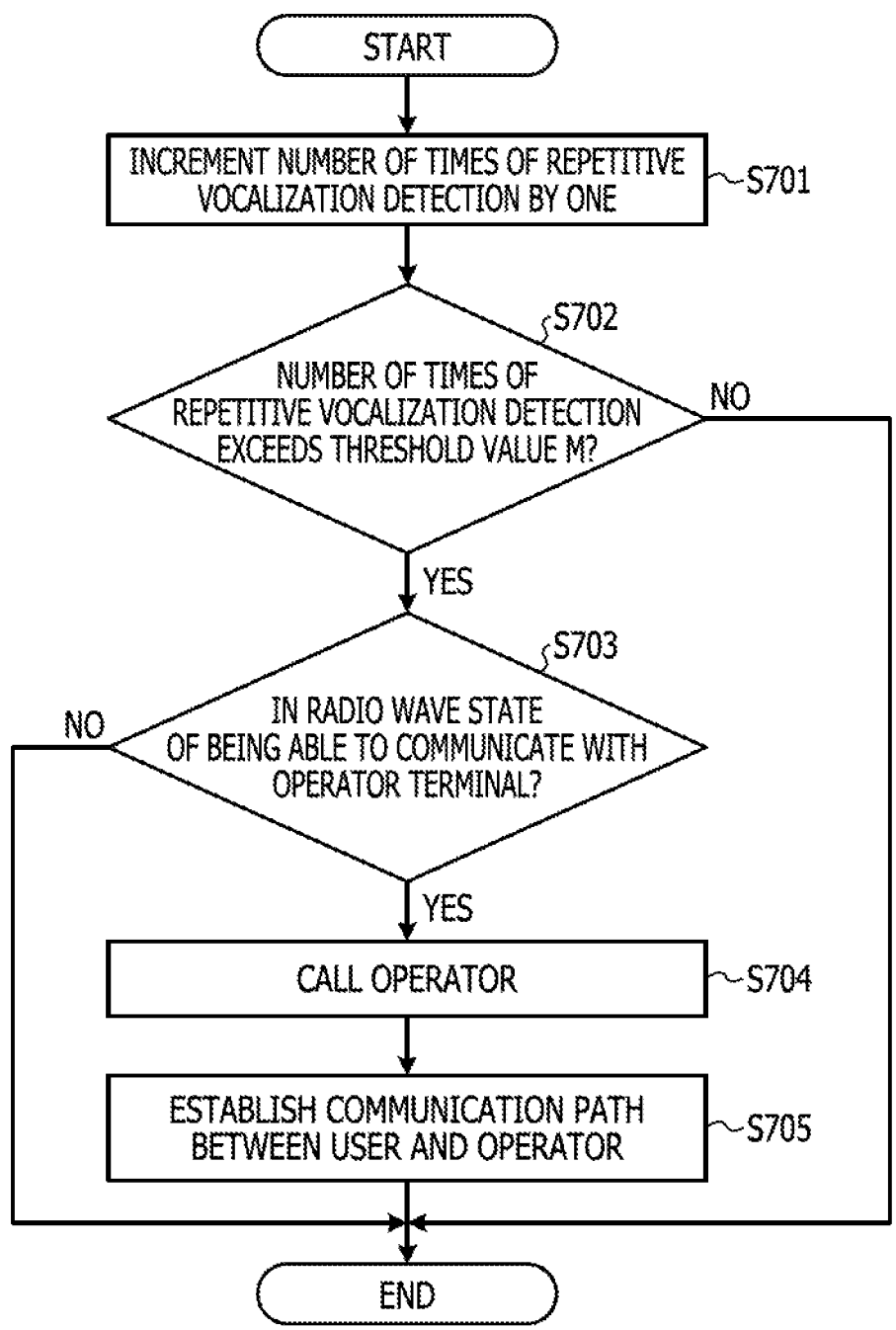
FIG. 15 is a flowchart illustrating a processing procedure of operator call processing.

Next, a processing procedure of the operator call processing illustrated in step S616 in FIG. 14 will be described. FIG. 15 is a flowchart illustrating a processing procedure of operator call processing. As illustrated in FIG. 15, the connection unit 410 in the voice recognition apparatus 400 increments the number of times of repetitive vocalization detection by one (step S701).

The connection unit 410 determines whether or not the number of times of repetitive vocalization detection exceeds a threshold value M (step S702). In a case where the number of times of repetitive vocalization detection does not exceed the threshold value M (step S702: No), the connection unit 410 terminates the processing.

On the other hand, in a case where the number of times of repetitive vocalization detection exceeds the threshold value M (step S702: Yes), the connection unit 410 determines whether or not being in a radio wave state of being able to communicate with the operator terminal 80 (step S703). In a case of not being in a radio wave state of being able to communicate with the operator terminal 80 (step S703: No), the connection unit 410 terminates the processing.

On the other hand, in a case of being in a radio wave state of being able to communicate with the operator terminal 80 (step S703: Yes), the connection unit 410 calls the operator (step S704) and establishes a communication path between the user and the operator (step S705).

Next, advantageous effects of the voice recognition apparatus 400 according to the present fourth embodiment will be described. In a case where the number of times of repetitive vocalization detection exceeds the threshold value, the voice recognition apparatus 400 establishes a communication path with the operator terminal 80 and requests the operator to respond to the user. For this reason, in a case where voice information difficult for the voice recognition apparatus 400 itself to recognize exists, it is possible for the voice recognition apparatus 400 to efficiently respond to a request of the user by requesting it to the operator.

Fifth Embodiment

Figure 16:
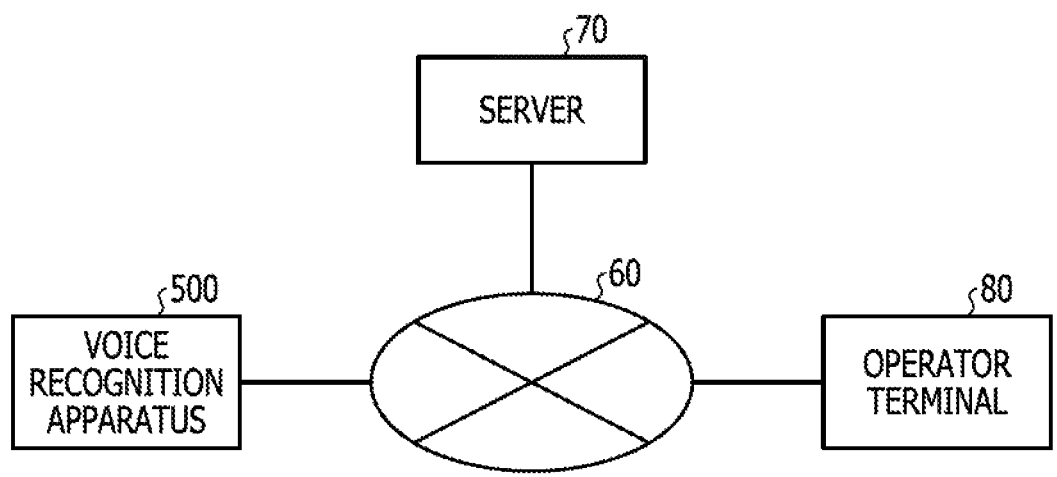
FIG. 16 is a diagram illustrating a configuration of a voice recognition system according to the present fifth embodiment.

FIG. 16 is a diagram illustrating a configuration of a voice recognition system according to the present fifth embodiment. As illustrated in FIG. 16, this voice recognition system includes a voice recognition apparatus 500, a server 70, and an operator terminal 80. The voice recognition apparatus 500 is connected to the server 70 and the operator terminal 80 via a network 60. The server 70 may be a server on a cloud.

The voice recognition apparatus 500 detects repetitive vocalization and counts the number of times being continuously detected. In the following description, it is assumed that the number of times repetitive vocalization is continuously detected is represented as the number of times of repetitive vocalization detection. In accordance with the number of times of repetitive vocalization detection, the voice recognition apparatus 500 performs the following processing.

In a case where the number of times of repetitive vocalization detection exceeds a first threshold value, the voice recognition apparatus 500 performs the processing in the output unit 220, described in the second embodiment. The voice recognition apparatus 500 notifies a user of a guidance corresponding to environmental information, for example.

In a case where the number of times of repetitive vocalization detection exceeds a second threshold values, the voice recognition apparatus 500 performs the processing in the transmission unit 310, described in the third embodiment. The voice recognition apparatus 500 establishes a connection with the server 70 and transmits voice information to the server 70, for example.

In a case where the number of times of repetitive vocalization detection exceeds a third threshold value, the voice recognition apparatus 500 performs the processing in the connection unit 410, described in the fourth embodiment. The voice recognition apparatus 500 calls an operator who operates the operator terminal 80 and establishes a telephone call path between a user in a vehicle and the operator, for example.

A description related to the server 70 illustrated in FIG. 16 is the same as the description related to the server 70 illustrated in FIG. 8. A description related to the operator terminal 80 illustrated in FIG. 16 is the same as the description related to the operator terminal 80 illustrated in FIG. 12.

Figure 17:
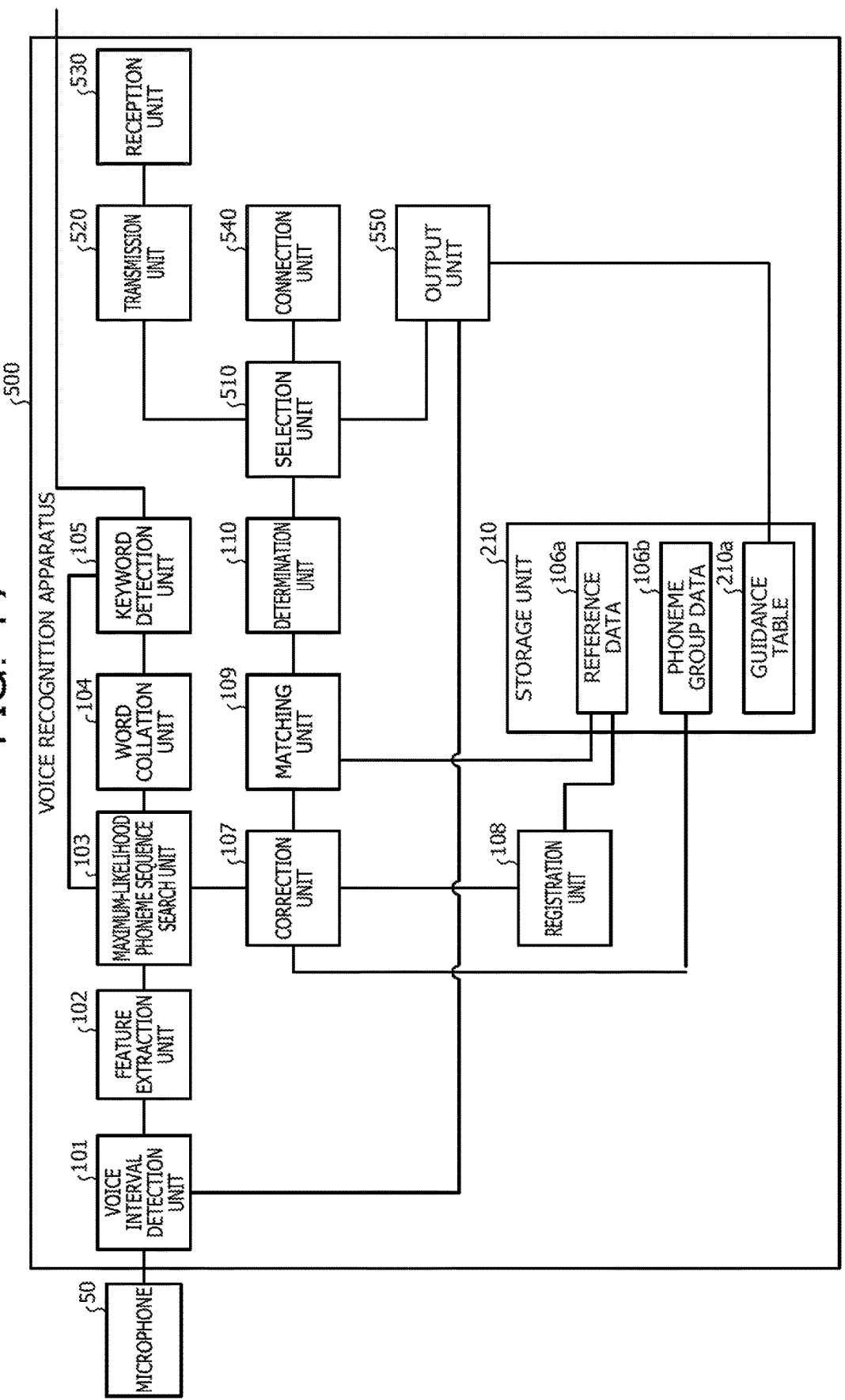
FIG. 17 is a functional block diagram illustrating a configuration of a voice recognition apparatus according to the present fifth embodiment.

Next, a configuration of the voice recognition apparatus 500 illustrated in FIG. 16 will be described. FIG. 17 is a functional block diagram illustrating a configuration of a voice recognition apparatus according to the present fifth embodiment. As illustrated in FIG. 17, this voice recognition apparatus 500 is connected to a microphone 50. In the same way as the voice recognition apparatus 100, the voice recognition apparatus 500 is installed in a vehicle or the like, driven by a user, and is connected to a car navigation system. A description related to the microphone 50 is the same as the description related to the microphone 50 illustrated in FIG. 1.

The voice recognition apparatus 500 includes a voice interval detection unit 101, a feature extraction unit 102, a maximum-likelihood phoneme sequence search unit 103, a word collation unit 104, a keyword detection unit 105, a correction unit 107, a registration unit 108, a matching unit 109, a determination unit 110, and a storage unit 210. The voice recognition apparatus 500 includes a selection unit 510, a transmission unit 520, a reception unit 530, a connection unit 540, and an output unit 550. Descriptions related to the respective processing units 101 to 105 and 107 to 110 in the voice recognition apparatus 500 are the same as the descriptions related to the respective processing units 101 to 105 and 107 to 110 illustrated in FIG. 1. In addition, a description related to the storage unit 210 is the same as the description related to the storage unit 210 illustrated in FIG. 5.

The selection unit 510 counts the number of times of repetitive vocalization detection in which the determination unit 110 continuously determines as repetitive vocalization. In response to the number of times of repetitive vocalization detection, the selection unit 510 selects a processing unit from among the transmission unit 520, the connection unit 540, and the output unit 550 and causes the selected processing unit to perform processing.

In a case where the number of times of repetitive vocalization detection exceeds the first threshold value, the selection unit 510 selects the output unit 550 and causes the output unit 550 to perform processing, for example. In a case where the number of times of repetitive vocalization detection exceeds the second threshold value, the selection unit 510 selects the transmission unit 520 and causes the transmission unit 520 to perform processing. In a case where the number of times of repetitive vocalization detection exceeds the third threshold value, the selection unit 510 selects the connection unit 540 and causes the connection unit 540 to perform processing. It is assumed that the first threshold value is "three times", the second threshold value is "four times", and the third threshold value is "five times", for example.

The processing in the transmission unit 520 corresponds to the processing in the transmission unit 310 illustrated in FIG. 9. The processing in the reception unit 530 corresponds to the processing in the reception unit 320 illustrated in FIG. 9.

The processing in the connection unit 540 corresponds to the processing in the connection unit 410 illustrated in FIG. 13.

The processing in the output unit 550 corresponds to the processing in the output unit 220 illustrated in FIG. 5.

Figure 18:
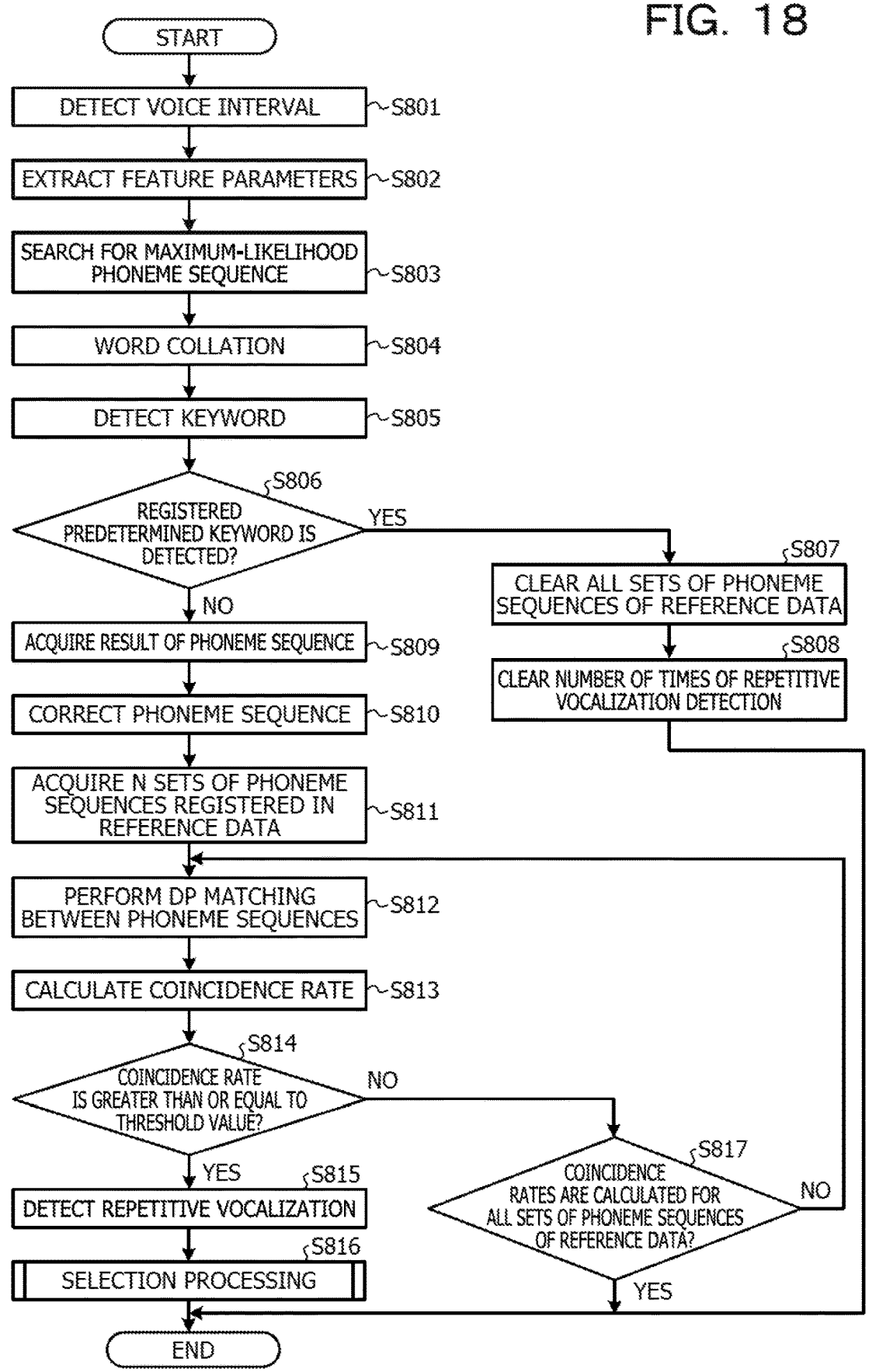
FIG. 18 is a flowchart illustrating a procedure of processing in the voice recognition apparatus according to the present fifth embodiment.

Next, a procedure of processing in the voice recognition apparatus 500 according to the present fifth embodiment will be described. FIG. 18 is a flowchart illustrating a procedure of processing in the voice recognition apparatus according to the present fifth embodiment. As illustrated in FIG. 18, the voice interval detection unit 101 in this voice recognition apparatus 500 detects a voice interval of voice information (step S801). The feature extraction unit 102 in the voice recognition apparatus 500 extracts feature parameters (step S802).

The maximum-likelihood phoneme sequence search unit 103 in the voice recognition apparatus 500 searches for a maximum-likelihood phoneme sequence (step S803). The word collation unit 104 in the voice recognition apparatus 500 performs word collation, based on the feature parameters of the voice information (step S804). The keyword detection unit 105 in the voice recognition apparatus 500 performs detection of a keyword, based on a word collation result (step S805).

In a case where a registered predetermined keyword is detected (step S806: Yes), the keyword detection unit 105 clears all sets of phoneme sequences of the reference data 106a (step S807). The keyword detection unit 105 clears the number of times of repetitive vocalization detection (step S808) and terminates the processing. On the other hand, in a case where no registered predetermined keyword is detected (step S806: No), the keyword detection unit 105 makes a transition to step S809.

The correction unit 107 in the voice recognition apparatus 500 acquires a result of a phoneme sequence (step S809) and corrects the phoneme sequence (step S810). The matching unit 109 in the voice recognition apparatus 500 acquires N sets of phoneme sequences registered in the reference data 106a (step S811).

The matching unit 109 performs DP matching between phoneme sequences (step S812) and calculates a coincidence rate (step S813). The determination unit 110 in the voice recognition apparatus 500 determines whether or not the coincidence rate is greater than or equal to a threshold value (step S814).

In a case where the coincidence rate is greater than or equal to the threshold value (step S814: Yes), the determination unit 110 detects repetitive vocalization (step S815), and the selection unit 510 in the voice recognition apparatus 500 performs selection processing (step S816).

On the other hand, in a case where the coincidence rate is less than the threshold value (step S814: No), the determination unit 110 determines whether or not coincidence rates are calculated for all the sets of phoneme sequences of the reference data 106a (step S817).

In a case where coincidence rates are calculated for all the sets of phoneme sequences of the reference data 106a (step S817: Yes), the determination unit 110 terminates the processing. On the other hand, in a case where coincidence rates are not calculated for all the sets of phoneme sequences of the reference data 106a (step S817: No), the determination unit 110 makes a transition to step S812.

Figure 19:
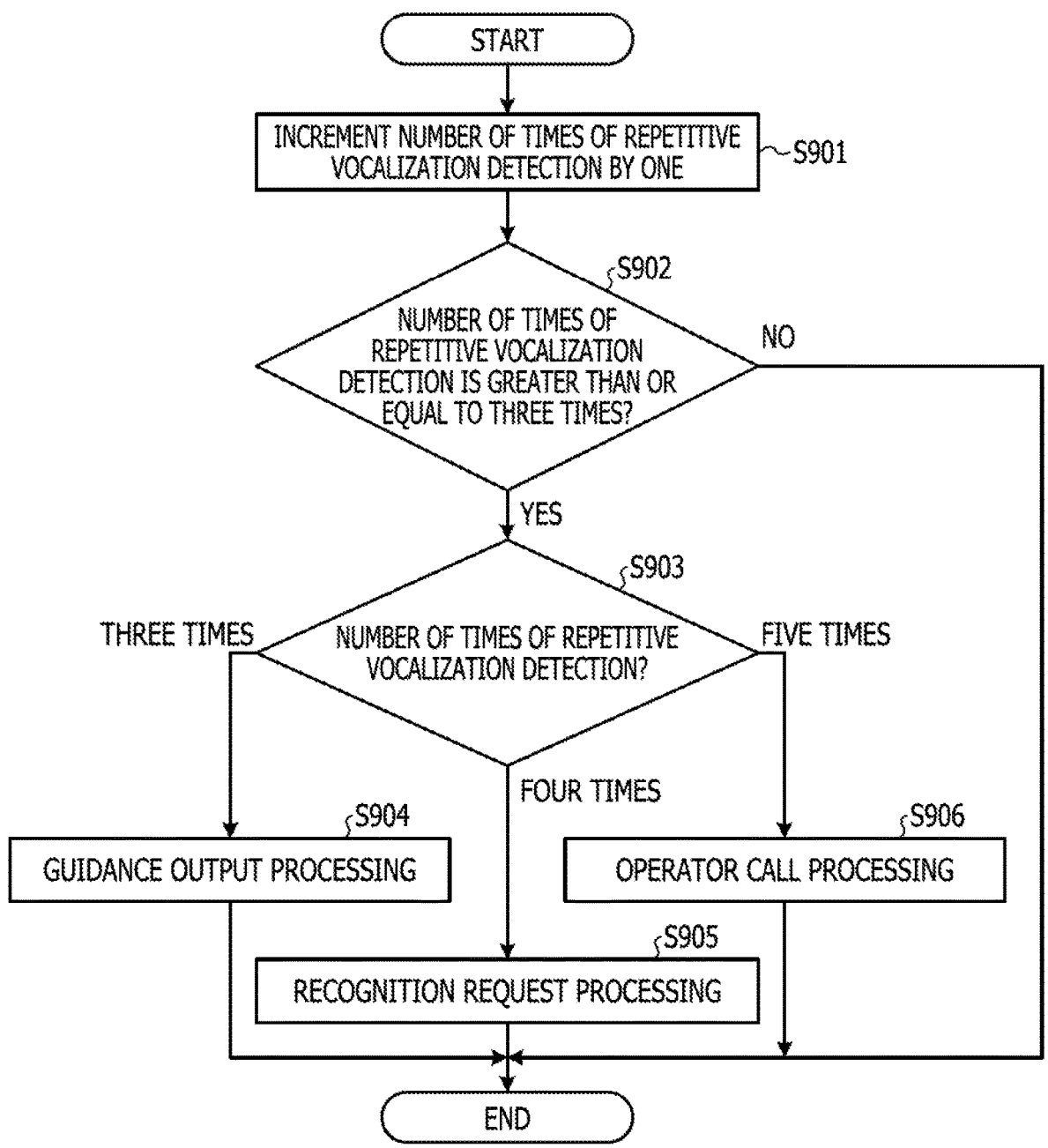
FIG. 19 is a flowchart illustrating a processing procedure of selection processing.

Next, a processing procedure of the selection processing illustrated in step S816 in FIG. 18 will be described. FIG. 19 is a flowchart illustrating a processing procedure of selection processing. As illustrated in FIG. 19, the selection unit 510 in the voice recognition apparatus 500 increments the number of times of repetitive vocalization detection by one (step S901). The selection unit 510 determines whether or not the number of times of repetitive vocalization detection is greater than or equal to three times (step S902). In a case where the number of times of repetitive vocalization detection is not greater than or equal to three times (step S902: No), the selection unit 510 terminates the processing.

On the other hand, in a case where the number of times of repetitive vocalization detection is greater than or equal to three times (step S902: Yes), the selection unit 510 makes a transition to step S903. In a case where the number of times of repetitive vocalization detection is equal to three times (step S903: three times), the selection unit 510 causes guidance output processing based on the output unit 550 to be performed (step S904). The guidance output processing has the same processing procedure as the processing procedure illustrated in FIG. 7.

In a case where the number of times of repetitive vocalization detection is equal to four times (step S903: four times), the selection unit 510 causes the recognition request processing based on the transmission unit 520 to be performed (step S905).

In a case where the number of times of repetitive vocalization detection is equal to five times (step S903: five times), the selection unit 510 causes the operator call processing based on the connection unit 540 to be performed (step S906).

Next, advantageous effects of the voice recognition apparatus 500 according to the present fifth embodiment will be described. The voice recognition apparatus 500 counts the number of times of repetitive vocalization detection and performs the guidance output processing, the recognition request processing, or the operator call processing in accordance with the number of times of repetitive vocalization detection. Therefore, in accordance with the number of times of repetitive vocalization detection, it is possible to perform optimum processing in a stepwise manner.

Figure 20:
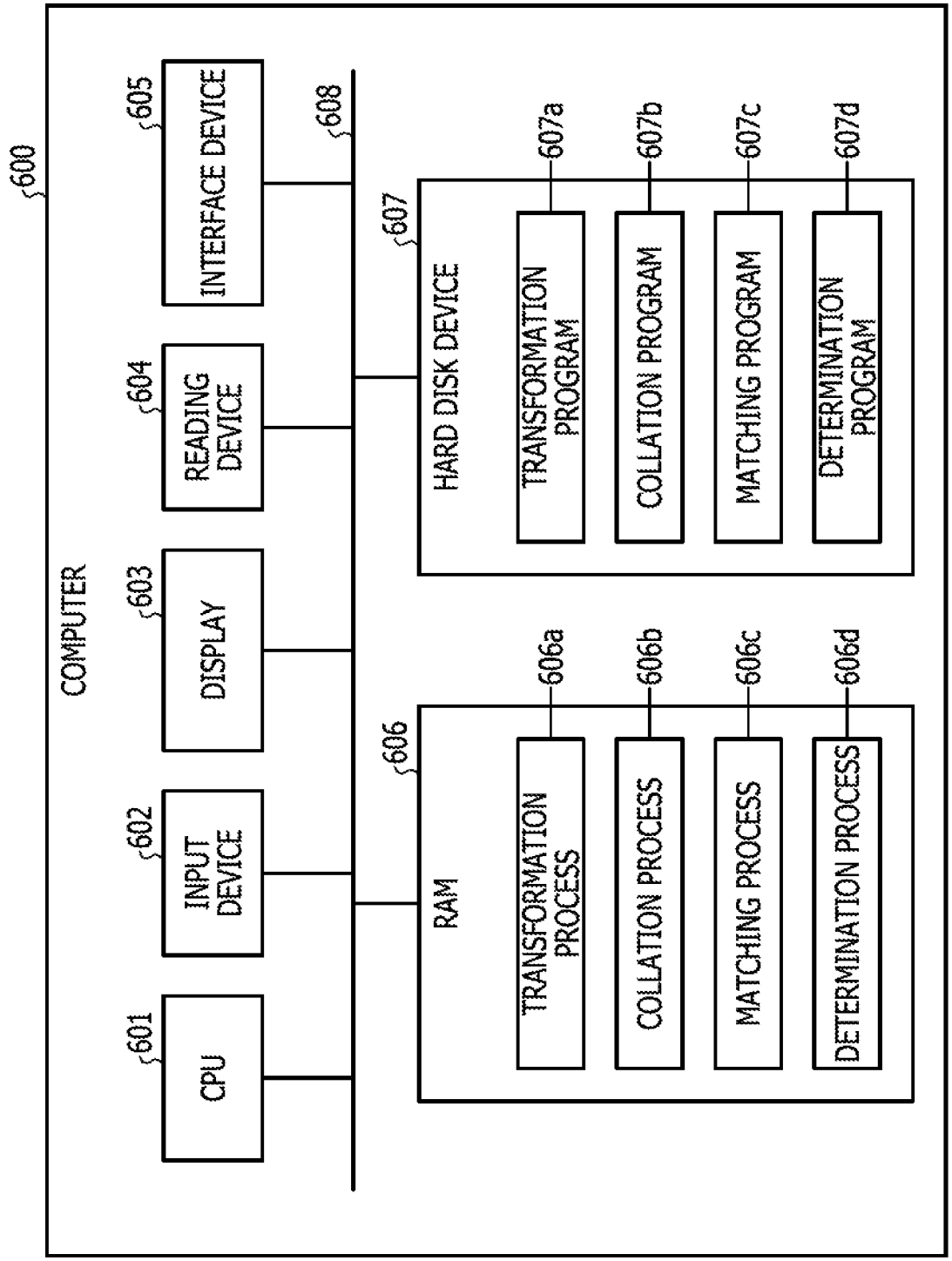
FIG. 20 is a diagram illustrating an example of a hardware configuration of a voice recognition apparatus.

Next, a hardware configuration of a computer to realize the same functions as those of the voice recognition apparatuses 100, 200, 300, 400, and 500 illustrated in the above-mentioned embodiments will be described. FIG. 20 is a diagram illustrating an example of a hardware configuration of a voice recognition apparatus.

As illustrated in FIG. 20, a computer 600 includes a CPU 601 that performs various kinds of arithmetic processing, an input device 602 that receives inputting of data from a user, and a display 603. In addition, the computer 600 includes a reading device 604 that reads a program and so forth from a storage medium, and an interface device 605 that transmits and receives pieces of data to and from another computer via a network. In addition, the computer 600 includes a RAM 606 that temporarily stores therein various kinds of information, and a hard disk device 607. In addition, the individual devices 601 to 607 are connected to a bus 608.

The hard disk device 607 includes a transformation program 607a, a collation program 607b, a matching program 607c, and a determination program 607d. The CPU 601 reads and deploys the individual programs 607a to 607d in the RAM 606. The transformation program 607a functions as a transformation process 606a. The collation program 607b functions as a collation process 606b. The matching program 607c functions as a matching process 606c. The determination program 607d functions as a determination process 606d.

Processing in the transformation process 606a corresponds to processing in the maximum-likelihood phoneme sequence search unit 103, for example. Processing in the collation process 606b corresponds to processing in the word collation unit 104 and processing in the keyword detection unit 105. Processing in the matching process 606c corresponds to processing in the matching unit 109. Processing in the determination process 606d corresponds to processing in the determination unit 110.

Note that each of the programs 607a to 607d does not have to be stored in the hard disk device 607 from the beginning. The individual programs are stored in a "portable physical medium" such as a flexible disk (FD), a CD-ROM, a DVD disk, a magneto-optical disk, or an IC card, which is to be inserted into the computer 600, for example. In addition, these individual programs 607a to 607d may be read from one of these by the computer 600, thereby being executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for voice recognition, the apparatus comprising:
   a memory;
   a processor coupled to the memory and configured to
   execute a transformation process that includes transforming first voice information obtained at a first time point into a first phoneme sequence, each element of the first phoneme sequence indicating a phoneme corresponding to feature parameters of the first voice information,
   execute a collation process that includes acquiring a first likelihood and a second likelihood, the first likelihood being obtained based on the feature parameters of the first voice information and the first phoneme sequence, and the second likelihood being obtained based on the feature parameters of the first voice information and a second phoneme sequence of a predetermined keyword,
   execute a matching process when a difference between the first likelihood and the second likelihood is greater than a predetermined threshold, the matching process being configured to acquire a coincidence rate between the first phoneme sequence and a third phoneme sequence, the first phoneme sequence being derived from the first voice information obtained at the first time point, the third phoneme sequence being derived from second voice information obtained at a second time point different from the first time point,
   execute a determination process that includes determining, based on a result of the matching process, whether a repetitive vocalization exists in the first voice information, and
   execute a selection process that includes selecting at least any one of output processing, transmission processing, and connection processing, based on the number of times it is continuously determined that the phoneme sequence of the voice information is based on repetitive vocalization,
   wherein
   the output processing includes selecting, based on a priority, a message not selected, from information in which priorities and messages each prompting to improve a voice input are associated with each other, and outputting the selected message,
   the transmission processing includes transmitting the voice information to a server, and
   the connection processing includes connecting the voice recognition apparatus and a terminal device operated by an operator to each other via a network.

2. The apparatus according to claim 1, wherein the processor is configured to execute a correction process that includes correcting a phoneme include in the phoneme sequence to a character of a representative phoneme, based on a table in which phoneme groups each obtained by putting similar phonemes together and characters of representative phonemes are associated with each other.

3. The apparatus according to claim 2, wherein the correction process includes deleting a character of a phoneme that indicates silence and that is included in phonemes included in the phoneme sequence.

4. The apparatus according to claim 1, wherein the selection process is configured to execute the transmission process when the number of times it is continuously determined that the phoneme sequence of the voice information is based on repetitive vocalization becomes greater than or equal to a predetermined number of times.

5. The apparatus according to claim 1, wherein the selection process is configured to execute the output process when it is determined that the phoneme sequence of the voice information is based on repetitive vocalization.

6. An apparatus for voice recognition, the apparatus comprising:
   a memory;
   a processor coupled to the memory and configured to
   execute a transformation process that includes transforming first voice information obtained at a first time point into a first phoneme sequence, each element of the first phoneme sequence indicating a phoneme corresponding to feature parameters of the first voice information, execute a collation process that includes acquiring a first likelihood and a second likelihood, the first likelihood being obtained based on the feature parameters of the first voice information and the first phoneme sequence, and the second likelihood being obtained based on the feature parameters of the first voice information and a second phoneme sequence of a predetermined keyword, execute a matching process when a difference between the first likelihood and the second likelihood is greater than a predetermined threshold, the matching process being configured to acquire a coincidence rate between the first phoneme sequence and a third phoneme sequence, the first phoneme sequence being derived from the first voice information obtained at the first time point, the third phoneme sequence being derived from second voice information obtained at a second time point different from the first time point, execute a determination process that includes determining, based on a result of the matching process, whether a repetitive vocalization exists in the first voice information, wherein the matching process includes associating, by performing dynamic programming (DP) matching, individual phonemes of the phoneme sequence and individual phonemes of a phoneme sequence of previous voice information with each other, and calculating a coincidence rate, based on the number of phonemes coincident with associated phonemes, the number of phonemes for which no corresponding phonemes exist, and the number of phonemes different from associated phonemes, and the determination process includes determining as repetitive vocalization, in a case where the coincidence rate exceeds a threshold value.

7. An apparatus for voice recognition, the apparatus comprising:

a memory;

a processor coupled to the memory and configured to execute a transformation process that includes transforming first voice information obtained at a first time point into a first phoneme sequence, each element of the first phoneme sequence indicating a phoneme corresponding to feature parameters of the first voice information, execute a collation process that includes acquiring a first likelihood and a second likelihood, the first likelihood being obtained based on the feature parameters of the first voice information and the first phoneme sequence, and the second likelihood being obtained based on the feature parameters of the first voice information and a second phoneme sequence of a predetermined keyword, execute a matching process when a difference between the first likelihood and the second likelihood is greater than a predetermined threshold, the matching process being configured to acquire a coincidence rate between the first phoneme sequence and a third phoneme sequence, the first phoneme sequence being derived from the first voice information obtained at the first time point, the third phoneme sequence being derived from second voice information obtained at a second time point different from the first time point, execute a determination process that includes determining, based on a result of the matching process, whether a repetitive vocalization exists in the first voice information, wherein the processor is configured to execute a connection process that includes connecting the voice recognition apparatus and a terminal device operated by an operator to each other via a network in a case where the number of times it is continuously determined that the phoneme sequence of the voice information is based on repetitive vocalization becomes greater than or equal to a predetermined number of times.

8. A method for voice recognition implemented by processor circuitry, the method comprising:

executing, by the processor circuitry, a transformation process that includes transforming first voice information obtained at a first time point into a first phoneme sequence, each element of the first phoneme sequence indicating a phoneme corresponding to feature parameters of the first voice information, executing, by the processor circuitry, a collation process that includes acquiring a first likelihood and a second likelihood, the first likelihood being obtained based on the feature parameters of the first voice information and the first phoneme sequence, and the second likelihood being obtained based on the feature parameters of the first voice information and a second phoneme sequence of a predetermined keyword, executing, by the processor circuitry, a matching process when a difference between the first likelihood and the second likelihood is greater than a predetermined threshold, the matching process being configured to acquire a coincidence rate between the first phoneme sequence and a third phoneme sequence, the first phoneme sequence being derived from the first voice information obtained at the first time point, the third phoneme sequence being derived from second voice information obtained at a second time point different from the first time point, executing, by the processor, a determination process that includes determining, based on a result of the matching process, whether a repetitive vocalization exists in the first voice information, and execute, by the processor circuitry, a selection process that includes selecting at least any one of output processing, transmission processing, and connection processing, based on the number of times it is continuously determined that the phoneme sequence of the voice information is based on repetitive vocalization, the output processing includes selecting, based on a priority, a message not selected, from information in which priorities and messages each prompting to improve a voice input are associated with each other, and outputting the selected message, the transmission processing includes transmitting the voice information to a server, and the connection processing includes connecting the voice recognition apparatus and a terminal device operated by an operator to each other via a network.

9. The method according to claim 8, wherein the selection process is configured to execute the transmission process when the number of times it is continuously determined that the phoneme sequence of the voice information is based on repetitive vocalization becomes greater than or equal to a predetermined number of times.

10. The method according to claim 8, the method further comprising:
executing, by the processor circuitry, a correction process that includes correcting a phoneme include in the phoneme sequence to a character of a representative phoneme, based on a table in which phoneme groups each obtained by putting similar phonemes together and characters of representative phonemes are associated with each other.

11. The method according to claim 10,
wherein the correction process includes deleting a character of a phoneme that indicates silence and that is included in phonemes included in the phoneme sequence.

12. The method according to claim 8,
wherein the matching process includes
associating, by performing dynamic programming (DP) matching, individual phonemes of the phoneme sequence and individual phonemes of a phoneme sequence of previous voice information with each other, and
calculating a coincidence rate, based on the number of phonemes coincident with associated phonemes, the number of phonemes for which no corresponding phonemes exist, and the number of phonemes different from associated phonemes, and
the determination process includes determining as repetitive vocalization, in a case where the coincidence rate exceeds a threshold value.

13. The method according to claim 8,
wherein the selection process is configured to execute the output process when it is determined that the phoneme sequence of the voice information is based on repetitive vocalization.

14. A non-transitory computer-readable storage medium storing a program that causes processor circuitry to execute a process, the process comprising:
executing a transformation process that includes transforming first voice information obtained at a first time point into a first phoneme sequence, each element of the first phoneme sequence indicating a phoneme corresponding to feature parameters of the first voice information,
executing a collation process that includes acquiring first likelihood and a second likelihood, the first likelihood being obtained based on the feature parameters of the first voice information and the first phoneme sequence, and the second likelihood being obtained based on the feature parameters of the first voice information and a second phoneme sequence of a predetermined keyword,
executing a matching process when a difference between the first likelihood and the second likelihood is greater than a predetermined threshold, the matching process being configured to acquire a coincidence rate between the first phoneme sequence and a third phoneme sequence, the first phoneme sequence being derived from the first voice information obtained at the first time point, the third phoneme sequence being derived from second voice information obtained at a second time point different from the first time point,
executing a determination process that includes determining, based on a result of the matching process, whether a repetitive vocalization exists in the first voice information, and
executing a selection process that includes selecting at least any one of output processing, transmission processing, and connection processing, based on the number of times it is continuously determined that the phoneme sequence of the voice information is based on repetitive vocalization,
the output processing includes selecting, based on a priority, a message not selected, from information in which priorities and messages each prompting to improve a voice input are associated with each other, and outputting the selected message,
the transmission processing includes transmitting the voice information to a server, and
the connection processing includes connecting the voice recognition apparatus and a terminal device operated by an operator to each other via a network.

15. The non-transitory computer-readable storage medium according to claim 14,
wherein the selection process is configured to execute the transmission process when the number of times it is continuously determined that the phoneme sequence of the voice information is based on repetitive vocalization becomes greater than or equal to a predetermined number of times.

16. The non-transitory computer-readable storage medium according to claim 14, the process further comprising:
executing a correction process that includes correcting a phoneme include in the phoneme sequence to a character of a representative phoneme, based on a table in which phoneme groups each obtained by putting similar phonemes together and characters of representative phonemes are associated with each other.

17. The non-transitory computer-readable storage medium according to claim 16,
wherein the correction process includes deleting a character of a phoneme that indicates silence and that is included in phonemes included in the phoneme sequence.

18. The non-transitory computer-readable storage medium according to claim 14,
wherein the matching process includes
associating, by performing dynamic programming (DP) matching, individual phonemes of the phoneme sequence and individual phonemes of a phoneme sequence of previous voice information with each other, and
calculating a coincidence rate, based on the number of phonemes coincident with associated phonemes, the number of phonemes for which no corresponding phonemes exist, and the number of phonemes different from associated phonemes, and
the determination process includes determining as repetitive vocalization, in a case where the coincidence rate exceeds a threshold value.

19. The non-transitory computer-readable storage medium according to claim 14,
wherein the selection process is configured to execute the output process when it is determined that the phoneme sequence of the voice information is based on repetitive vocalization.

* * * * *